United States Patent
Jung et al.

(10) Patent No.: US 10,133,311 B2
(45) Date of Patent: Nov. 20, 2018

(54) DETACHABLE ELECTRONIC DEVICE

(71) Applicant: Samsung Electronics Co., Ltd., Suwon-si, Gyeonggi-do (KR)

(72) Inventors: Bo-Hyun Jung, Suwon-si (KR); Chong-Du Kim, Suwon-si (KR); Yong-Woo Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/657,691

(22) Filed: Jul. 24, 2017

(65) Prior Publication Data
US 2017/0322599 A1 Nov. 9, 2017

Related U.S. Application Data

(63) Continuation of application No. 14/713,169, filed on May 15, 2015, now Pat. No. 9,715,253.

(30) Foreign Application Priority Data

May 16, 2014 (KR) .................. 10-2014-0059289

(51) Int. Cl.
*G06F 1/16* (2006.01)

(52) U.S. Cl.
CPC .......... *G06F 1/1654* (2013.01); *G06F 1/1616* (2013.01); *G06F 1/1626* (2013.01); *G06F 1/1632* (2013.01); *G06F 1/1656* (2013.01); *G06F 1/1681* (2013.01)

(58) Field of Classification Search
CPC combination set(s) only.
See application file for complete search history.

(56) References Cited

U.S. PATENT DOCUMENTS

| | | | |
|---|---|---|---|
| 5,175,672 A | 12/1992 | Conner et al. | |
| 5,229,757 A | 7/1993 | Takamiya et al. | |
| 6,856,506 B2 | 2/2005 | Doherty et al. | |
| 7,082,028 B2 | 7/2006 | Huilgol et al. | |
| 8,300,389 B2 | 10/2012 | Kang et al. | |
| 8,315,048 B2 | 11/2012 | Tarnoff | |
| 8,599,542 B1* | 12/2013 | Healey ............... | G06F 1/1626 345/168 |
| 8,913,376 B2 | 12/2014 | Wu et al. | |
| 8,934,232 B2 | 1/2015 | Hsu et al. | |
| 9,310,848 B2 | 4/2016 | Fujino et al. | |
| 9,348,363 B2 | 5/2016 | Hui et al. | |
| 2004/0233620 A1* | 11/2004 | Doczy ............... | G06F 1/1626 361/679.15 |

(Continued)

FOREIGN PATENT DOCUMENTS

KR 10-2013-0080135 A 7/2013

*Primary Examiner* — Lisa Lea Edmonds
(74) *Attorney, Agent, or Firm* — Jefferson IP Law, LLP

(57) ABSTRACT

An electronic device is provided. The electronic device includes a mounting surface configured to accept another electronic device, a holder recess provided in the mounting surface and configured to hold the other electronic device at certain angles, and a rotatable clip installed in the mounting surface, and configured to control at least one part of the other electronic device, wherein other electronic device is accommodated at one end by the holder recess, and is accommodated at another end by the rotatable clip, such that the other electronic device is combined with the electronic device.

20 Claims, 31 Drawing Sheets

(56) References Cited

U.S. PATENT DOCUMENTS

| | | |
|---|---|---|
| 2010/0238620 A1 | 9/2010 | Fish |
| 2011/0292584 A1 | 12/2011 | Hung et al. |
| 2012/0092195 A1* | 4/2012 | Lin .................. G06F 1/1626 341/22 |
| 2012/0243149 A1* | 9/2012 | Gartrell ............. G06F 1/1616 361/679.01 |
| 2012/0325723 A1 | 12/2012 | Carnevali |
| 2012/0327594 A1 | 12/2012 | Gengler |
| 2013/0175909 A1* | 7/2013 | Wang ................ G06F 1/1626 312/223.1 |
| 2013/0214661 A1 | 8/2013 | McBroom |
| 2013/0248676 A1 | 9/2013 | Wang et al. |
| 2014/0029185 A1 | 1/2014 | Leong et al. |
| 2014/0071604 A1 | 3/2014 | Bates et al. |
| 2014/0075214 A1 | 3/2014 | Spollen |

\* cited by examiner

DETACHABLE ELECTRONIC DEVICE

CROSS-REFERENCE TO RELATED APPLICATION(S)

This application is a continuation application of prior application Ser. No. 14/713,169, filed on May 15, 2015, which claimed the benefit under 35 U.S.C. § 119(a) of a Korean patent application filed on May 16, 2014 in the Korean Intellectual Property Office and assigned Serial number 10-2014-0059289, the entire disclosure of which is hereby incorporated by reference.

TECHNICAL FIELD

The present disclosure relates to a detachable electronic device.

BACKGROUND

As a result of the growth of electronic telecommunication industries, electronic devices such as mobile communication terminals (i.e., smart phones), electronic schedulers, personal complex terminals, Televisions (TVs), laptop computers, tablet Personal Computers (PCs) and the like are becoming necessities to modern society. Accordingly, these electronic devices are becoming a significant means for delivering fast changing information. Further, these electronic devices can make a users' work convenient through a Graphical User Interface (GUI) environment that uses touch screens capable of performing data input/output in the same region, and can provide various types of multimedia based on a Web-based environment.

The aforementioned electronic devices are changing into various forms that are adaptive to the current trend of maximizing portability, and have a feature of providing various additional functions. For example, a support member that is openable/closable at certain angles is installed in a rear surface of the electronic device, such that a user can enjoy a video and the like while holding the electronic device at the certain angles, and a separate cover case is installed in a manner of covering at least one part of the electronic device and, at carrying, protects an appearance of the electronic device.

These various additional devices make the use of the electronic device more convenient, and are on a trend toward the development of more useful features and capabilities.

Detachable electronic devices according to the related art have been configured in a manner of extending a plurality of fixing ribs outside a cover device and surrounding an edge of a mounted electronic device. However, this structure causes a troublesome problem of increasing the size of the cover device and a problem of having to press each fixing portion for the purpose of mounting/demounting.

Also, detachable electronic devices according to the related art include an arrangement of a plurality of magnets in the cover device and in the mounted electronic device, so as to fix the cover device and the mounted electronic device to each other by magnetic force. However, this structure also has a design limitation because at least one part of the cover device should be formed of metal materials reacting to the magnetic force.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a detachable electronic device.

Another aspect of the present disclosure is to provide a detachable electronic device which is separated or combined and used, thereby improving a use convenience.

Another aspect of the present disclosure is to provide a detachable electronic device implemented to combine or separate at least two bodies to each other with ease.

Another aspect of the present disclosure is to provide a detachable electronic device implemented to prevent an increase of a volume of the whole device caused by a combination structure formed by mutual combination.

Another aspect of the present disclosure is to provide a detachable electronic device implemented to interwork separated bodies with each other, thereby improving a use convenience.

Another aspect of the present disclosure is to provide a detachable electronic device implemented to make a convenient use of one body through another body upon separation.

In accordance with an aspect of the present disclosure, an electronic device is provided. The electronic device includes a mounting surface configured to accept another electronic device, a holder recess provided in the mounting surface and configured to hold the other electronic device at certain angles, and a rotatable clip installed in the mounting surface, and configured to control at least one part of the other electronic device.

The other electronic device may be accommodated at one end by the holder recess, and may be accommodated at another end by the rotatable clip, such that the other electronic device is combined with the electronic device.

In accordance with another aspect of the present disclosure, an electronic device is provided. The electronic device includes a mounting surface configured to accept another electronic device, a holder recess provided in the mounting surface, and configured to hold the other electronic device at certain angles, and a rotatable clip installed in the mounting surface, and configured to control at least one part of the other electronic device.

In accordance with another aspect of the present disclosure, the holder recess may include a first support part configured to, when the other electronic device is held on the electronic device, support a rear surface of the other electronic device, and comprising a mounting space configured to control the other electronic device by surrounding the at least one part of the other electronic device, when the other electronic device is combined with and overlapped by the mounting surface of the electronic device, and a second support part configured to, when the other electronic device is held, support a front surface of the other electronic device.

In accordance with another aspect of the present disclosure, the other electronic device is configured to rotate at one end along the holder recess serving as a pivot shaft, is configured to be held by the first support part and the second support part, and is configured to be combined in a manner of being overlapped by the electronic device by the mounting space of the first support part and the rotatable clip.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
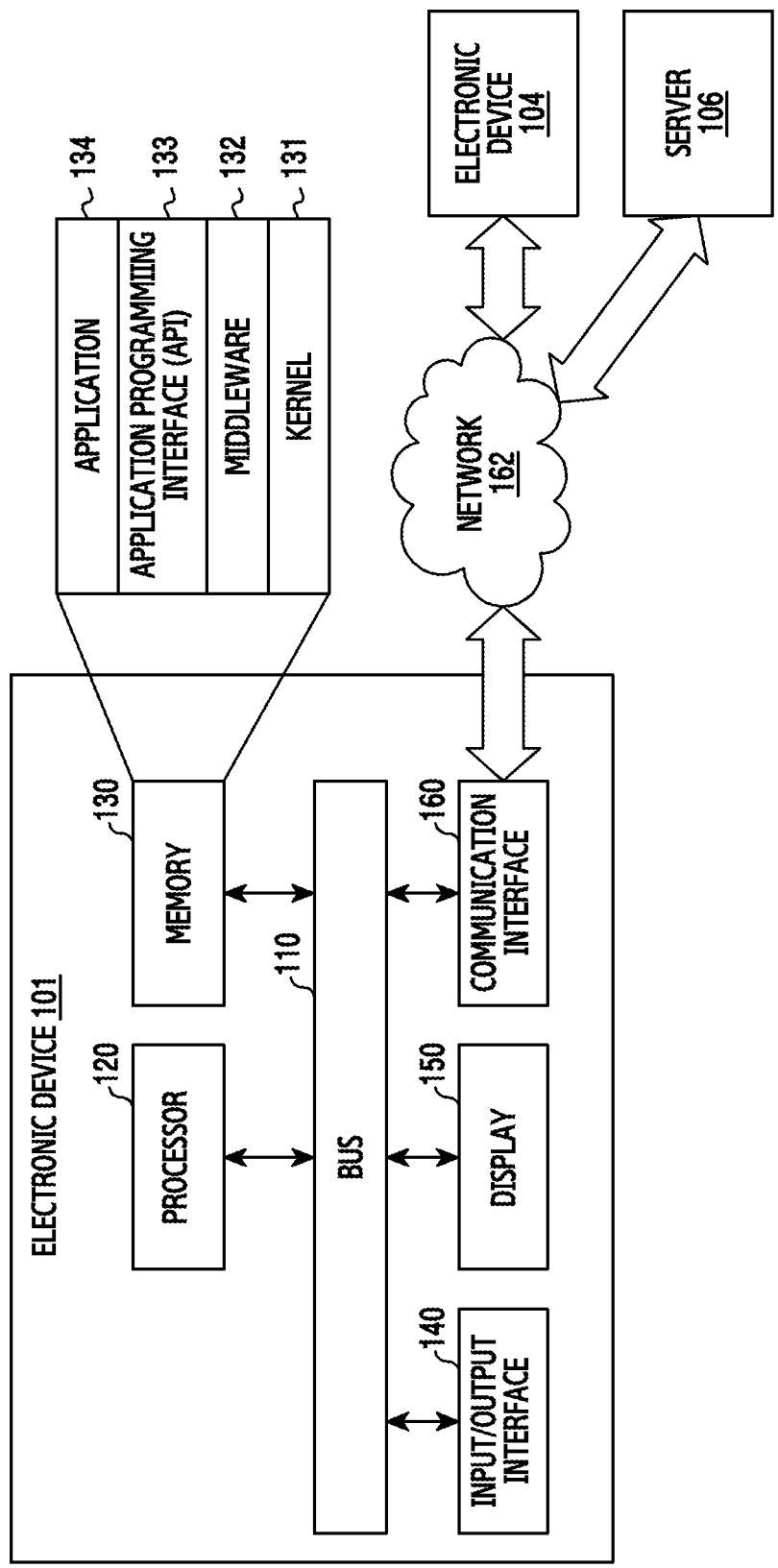
FIG. 1 is a diagram illustrating a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions "include" and/or "may include" used in the present disclosure are intended to indicate a presence of a corresponding function, operation, or element, and are not intended to limit a presence of one or more functions, operations, and/or elements. In addition, in the present disclosure, the terms "include" and/or "have" are intended to indicate that characteristics, numbers, operations, elements, and components disclosed in the specification or combinations thereof exist. As such, the terms "include" and/or "have" should be understood that there are additional possibilities of one or more other characteristics, numbers, operations, elements, elements or combinations thereof.

In the present disclosure, an expression "or" includes any and all combinations of words enumerated together. For example, "A or B" may include A or B, or may include both A and B.

Although expressions such as "$1^{st}$," "$2^{nd}$," "first," and "second" may be used to express various elements of the present disclosure, they are not intended to limit the corresponding elements. For example, the above expressions are not intended to limit an order or an importance of the corresponding elements. The above expressions may be used to distinguish one element from another element. For example, a $1^{st}$ user device and a $2^{nd}$ user device are both user devices, and indicate different user devices. For example, a $1^{st}$ element may be termed a $2^{nd}$ element, and similarly, the $2^{nd}$ element may be termed the $1^{st}$ element without departing from the scope of the present disclosure.

When an element is mentioned as being "connected" to or "accessing" another element, this may mean that it is directly connected to or accessing the other element, but it is to be understood that there may be intervening elements present. Alternatively, when an element is mentioned as being "directly connected" to or "directly accessing" another element, it is to be understood that there are no intervening elements present.

The terminology used in the present disclosure is for the purpose of describing particular embodiments only and is not intended to be limiting of the present disclosure. A singular expression includes a plural expression unless there is a contextually distinctive difference therebetween.

Unless otherwise defined, all terms (including technical and scientific terms) used herein have the same meaning as commonly understood by those ordinarily skilled in the art to which the present disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

An electronic device according to the present disclosure may be a device including a communication function. For example, the electronic device may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), an MPEG-1 Audio Layer 3 (MP3) player, a mobile medical device, a camera, and a wearable device (e.g., a Head-Mounted-Device (HMD) such as electronic glasses, electronic clothes, an electronic bracelet, an electronic necklace, an electronic appcessory, an electronic tattoo, or a smart watch).

According to various embodiments of the present disclosure, the electronic device may be a smart home appliance having a communication function. For example, the smart home appliance may include at least one of a Television (TV), a Digital Versatile Disc (DVD) player, an audio player, a refrigerator, an air conditioner, a cleaner, an oven, a microwave oven, a washing machine, an air purifier, a set-top box, a TV box (e.g., Samsung HomeSync™, Apple TV™, or Google TV™), a game console, an electronic dictionary, an electronic key, a camcorder, and an electronic picture frame.

According to various embodiments of the present disclosure, the electronic device may include at least one of various medical devices (e.g., Magnetic Resonance Angiography (MRA), Magnetic Resonance Imaging (MRI), Computed Tomography (CT), imaging equipment, ultrasonic instrument, and the like), a navigation device, a Global Positioning System (GPS) receiver, an Event Data Recorder (EDR), a Flight Data Recorder (FDR), a car infotainment device, an electronic equipment for ship (e.g., a vessel navigation device, a gyro compass, and the like), avionics, a security device, and an industrial or domestic robot.

According to various embodiments of the present disclosure, the electronic device may include at least one of furniture or a part of building/constructions including a screen output function, an electronic board, an electronic signature receiving device, a projector, and various measurement machines (e.g., a water supply measurement machine, an electricity measurement machine, a gas measurement machine, a propagation measurement machine, and the like). The electronic device according to the present disclosure may be one or more combinations of the aforementioned various devices. In addition, it is apparent those ordinarily skilled in the art that the electronic device according to the present disclosure is not limited to the aforementioned devices.

According to an embodiment of the present disclosure, the electronic device may include a plurality of displays capable of a screen output, and may output one screen by using the plurality of displays as one display or may output a screen to each display. According to an embodiment of the present disclosure, the plurality of displays may be connected with a connection portion, for example, a hinge, to be movable in a specific angle such according to a fold-in or fold-out manner.

According to an embodiment of the present disclosure, the electronic device may include a flexible display, and may output a screen by using the flexible display as one display or by dividing a display area into a plurality of parts with respect to a portion of the flexible display.

According to an embodiment of the present disclosure, the electronic device may be equipped with a cover having a display protection function capable of a screen output. According to an embodiment of the present disclosure, the electronic device may output one screen by using a display of the cover and a display of the electronic device as one display or may output a screen to each display.

Hereinafter, an electronic device according to various embodiments of the present disclosure will be described with reference to the accompanying drawings. The term "user" used in the various embodiments of the present disclosure may refer to a person who uses the electronic device or a device (e.g., an Artificial Intelligence (AI) electronic device) which uses the electronic device.

FIGS. 1 through 14, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 illustrates a network environment including an electronic device according to an embodiment of the present disclosure.

Referring to FIG. 1, an electronic device 101 is illustrated, where the electronic device 101 may include a bus 110, a processor 120, a memory 130, an input/output interface 140, a display 150, and a communication interface 160.

The bus 110 may be a circuit for connecting the aforementioned elements to each other and for delivering communication (e.g., a control message) between the aforementioned elements.

The processor 120 may receive an instruction from the aforementioned different elements (e.g., the memory 130, the input/output interface 140, the display 150, and/or the communication interface 160), for example, via the bus 110, and thus may interpret the received instruction and execute arithmetic or data processing according to the interpreted instruction.

The memory 130 may store an instruction or data received from the processor 120 or different elements (e.g., the input/output interface 140, the display 150, and/or the communication interface 160) or generated by the processor 120 or the different elements. The memory 130 may include programming modules such as a kernel 131, middleware 132, an Application Programming Interface (API) 133, an application 134, and the like. Each of the aforementioned programming modules may consist of software, firmware, or hardware entities or may consist of at least two or more combinations thereof.

The kernel 131 may control or manage the remaining other programming modules, for example, system resources (e.g., the bus 110, the processor 120, the memory 130, and the like) used to execute an operation or function implemented in the middleware 132, the API 133, or the application 134. In addition, the kernel 131 may provide a controllable or manageable interface by accessing individual elements of the electronic device 101 in the middleware 132, the API 133, or the application 134.

The middleware 132 may perform a mediation role such that the API 133 or the application 134 communicates with the kernel 131 to exchange data. In addition, regarding task requests received from the application 134, for example, the middleware 132 may perform a control (e.g., scheduling or load balancing) for the task requests by using a method of assigning a priority capable of using a system resource (e.g., the bus 110, the processor 120, the memory 130, and the like) of the electronic device 101 to at least one application 134.

The API 133 may include at least one interface or function (e.g., instruction) for file control, window control, video processing, character control, and the like, as an interface capable of controlling a function provided by the application 134 in the kernel 131 or the middleware 132.

According to various embodiments of the present disclosure, the application 134 may include a Short Message Service (SMS)/Multimedia Messaging Service (MIMS) application, an e-mail application, a calendar application, an alarm application, a health care application (e.g., an application for measuring a physical activity level, a blood sugar, and the like) or an environment information application (e.g., atmospheric pressure, humidity, or temperature information). Additionally or alternatively, the application 134 may be an application related to an information exchange between the electronic device 101 and an external electronic device (e.g., an electronic device 104). The application related to the information exchange may include, for example, a notification relay application for relaying specific information to the external electronic device or a device management application for managing the external electronic device.

For example, the notification relay application may include a function of relaying notification information generated in another application (e.g., an SMS/MMS application, an e-mail application, a health care application, an environment information application, and the like) of the electronic device 101 to the external electronic device (e.g., the electronic device 104). Additionally or alternatively, the notification relay application may receive notification information, for example, from the external electronic device (e.g., the electronic device 104) and may provide it to the user. The device management application may manage, for example, a function for at least one part of the external electronic device (e.g., the electronic device 104) which communicates with the electronic device 101. Examples of the function include turning on/turning off the external electronic device itself (or some components thereof) or adjusting of a display illumination (or a resolution), and managing (e.g., installing, deleting, or updating) of an application which operates in the external electronic device or a service (e.g., a call service or a message service) provided by the external electronic device.

According to various embodiments of the present disclosure, the application 134 may include an application specified according to attribute information (e.g., an electronic device type) of the external electronic device (e.g., the electronic device 104). For example, if the external electronic device is an MP3 player, the application 134 may include an application related to a music play. Similarly, if the external electronic device is a mobile medical device, the application 134 may include an application related to a health care. According to an embodiment of the present disclosure, the application 134 may include at least one of a specified application in the electronic device 101 or an application received from the external electronic device (e.g., a server 106 or the electronic device 104).

The input/output interface 140 may relay an instruction or data input from a user via an input/output device (e.g., a sensor, a keyboard, and/or a touch screen) to the processor 120, the memory 130, the communication interface 160, for example, via the bus 110. For example, the input/output interface 140 may provide data regarding a user's touch input via the touch screen to the processor 120. In addition, the input/output interface 140 may output an instruction or data received from the processor 120, the memory 130, the communication interface 160 to an output device (e.g., a speaker and/or a display), for example, via the bus 110. For example, the input/output interface 140 may output audio data provided by using the processor 120 to the user via the speaker.

The display 150 may display a variety of information (e.g., multimedia data or text data) to the user.

The communication interface 160 may connect a communication between the electronic device 101 and an external device (e.g., the electronic device 104, or the server 106). For example, the communication interface 160 may communicate with the external device by being connected with a network 162 through wireless communication or wired communication. For example, the wireless communication may include at least one of Wi-Fi, Bluetooth (BT), Near Field Communication (NFC), a GPS, and cellular communication (e.g., Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), Global System for Mobile Communications (GSM), and the like). For example, the wired communication may include at least one of Universal Serial Bus (USB), High Definition Multimedia Interface (HDMI), Recommended Standard (RS)-232, and Plain Old Telephone Service (POTS).

According to an embodiment of the present disclosure, the network 162 may be a telecommunications network. The telecommunications network may include at least one of a computer network, an internet, an internet of things, and a telephone network. According to an embodiment of the present disclosure, a protocol (e.g., a transport layer protocol, a data link layer protocol, or a physical layer protocol) for a communication between the electronic device 101 and the external device may be supported in at least one of the application 134, the API 133, the middleware 132, the kernel 131, and the communication interface 160.

Although an electronic device having an assembly structure between two housings is illustrated and explained in the description of various embodiments of the present disclosure, the present disclosure may also be applied to an electronic device having an assembly structure among three or more housings.

Although an electronic device is illustrated and an assembly structure of two housings which form an exterior of the electronic device is explained in the description of various embodiments of the present disclosure, the present disclosure is not limited thereto. For example, the present disclosure may be applied to various devices other than the electronic device, and may also be applied to an assembly structure between housings used as a part of an external or internal element other than the exterior of the device.

Various embodiments of the present disclosure illustrate and describe an electronic device whose two bodies can be detached from each other, but it makes no difference that three or more bodies are detached from one another.

Various embodiments of the present disclosure disclose the concept in which at least two bodies act as an electronic device and interwork with each other, but the at least two bodies may be separate electronic devices capable of operating individually without interworking with each other. Also, at least one of the bodies may be also an accessory device (e.g., a cover device) including no electronic components.

According to various embodiments of the present disclosure, a tablet PC having as a display at least one body being an electronic device is illustrated and described, but this does not intend to limit the scope of the present disclosure. For example, it may be also applied even to a portable electronic device having no display.

Figure 2A:
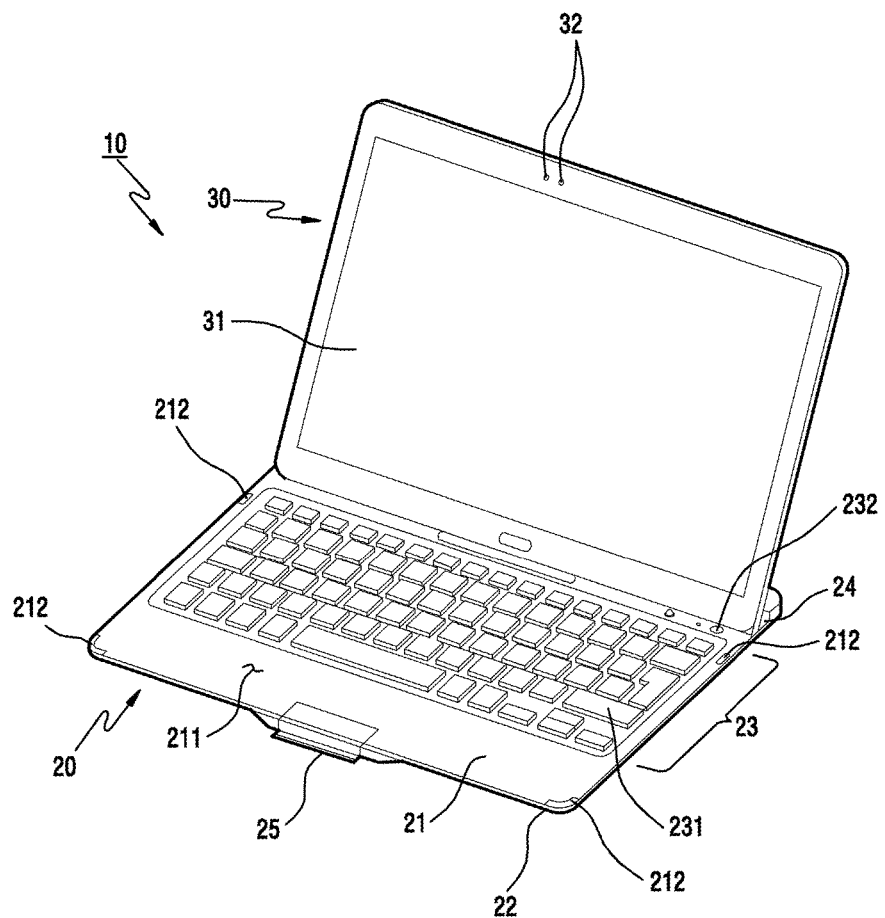
FIGS. 2A. 2B, and 2C are perspective diagrams and a side diagram illustrating a use state of an electronic device according to various embodiments of the present disclosure.
Figure 2B:
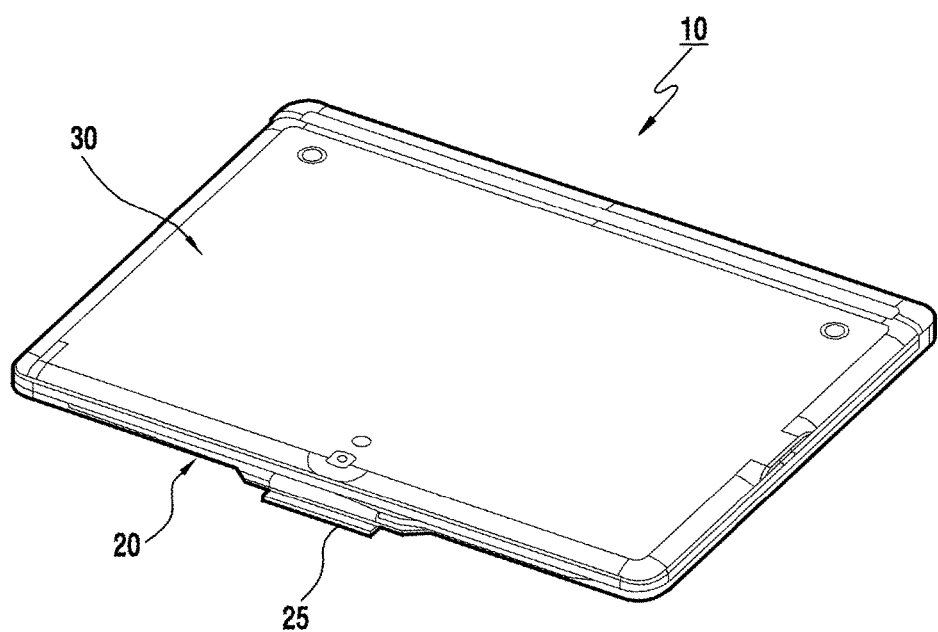
Figure 2C:
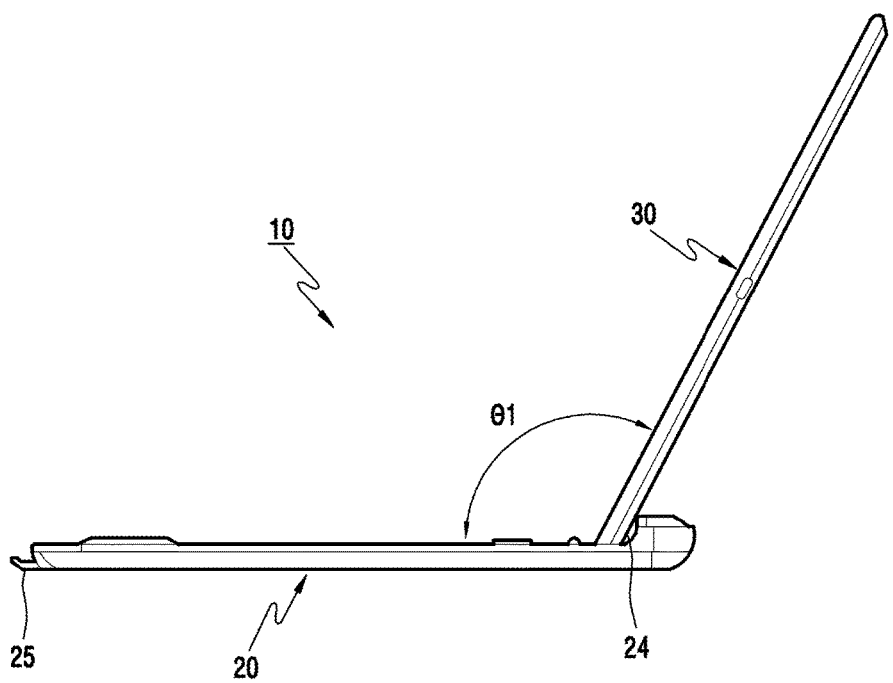

FIGS. 2A, 2B, and 2C are perspective diagrams and a side diagram illustrating a use state of an electronic device according to various embodiments of the present disclosure.

Referring to FIGS. 2A to 2C, a detachable electronic device 10 is illustrated, where the detachable electronic device 10 may, for example, hold one electronic device 30 on another electronic device 20 at certain angles (θ1 of FIG. 2C). These two electronic devices 20 and 30 may be connected with each other and be used in a form of one electronic device 10. The respective electronic devices 20 and 30 may be also used individually.

According to various embodiments of the present disclosure, the detachable electronic device 10 may include a first body (e.g., the electronic device 20, also referred to as the first body 20), and a second body (e.g., the electronic device 30, also referred to as the second body 30) combined with the first body 20. When the second body 30 is not used, as illustrated in FIG. 2B, the second body 30 may be combined with the first body 20 in an overlapping manner, thereby improving the portability of the electronic device 10. According to an embodiment of the present disclosure, the second body 30 may be combined with the first body 20 in such a manner that a display 31 of the second body 30 comes in contact with a mounting surface 211 of the first body 20. According to an embodiment of the present disclosure, the second body 30 may be combined with the first body 20 in such a manner that a rear surface of the second body 30 comes in contact with the mounting surface 211 of the first body 20.

According to various embodiments of the present disclosure, when the second body 30 is used, the second body 30 may be detached from the first body 20, and be held and used at certain angles in a holder recess 24 provided in the mounting surface 211 of the first body 20. According to an embodiment of the present disclosure, the rectangular second body 30 and first body 20 are generally formed to have the same form and size, but this does not intend to limit the scope of the present disclosure. For instance, only a partial region of the mounting surface 211 of the first body 20 may also accept the second body 30.

According to various embodiments of the present disclosure, the first body 20 may, for example, include a communication module, an antenna, a processor, a memory, a battery, a connector, a button, a camera, or the like. According to various embodiments of the present disclosure, the first body 20 may include a key assembly 23 (e.g., a keyboard device) including at least one key button 231 for inputting data through the first body 20. According to an embodiment of the present disclosure, the first body 20 may be wiredly or wirelessly connected with the second body 30 by means of a short-range communication means. According to an embodiment of the present disclosure, the first body 20 may be wiredly connected with the second body 30 through a connector, a contact point, a cable and the like. According to an embodiment of the present disclosure, the first body 20 may be connected with the second body 30 by the well-known short-range wireless communication means such as BT, Wi-Fi, Zigbee, NFC and the like.

According to an embodiment of the present disclosure, the first body 20 may further include a connection button 232 for connecting with the second body 30. For instance, the connection button 232 may be a button capable of turning On or Off communication connection between the first body 20 (e.g., the cover device) and the second body 30 (e.g., the tablet PC). But, this does not intend to limit the scope of the present disclosure, and the first body 20 and the second body 30 may also automatically interwork with each other by only an operation of holding the second body 30 in the holder recess 24 of the first body 20. This construction will be described later in detail.

According to various embodiments of the present disclosure, the second body 30 may be held at certain angles (θ of FIG. 2C) by only a self-structure of the holder recess 24 of the first body 20. According to an embodiment of the present disclosure, when the second body 30 is mounted on the first body 20 in such a manner that the second body 30 is overlapped with the first body 20, at least a partial region of the second body 30 may be accommodated by the holder recess 24. According to an embodiment of the present disclosure, separate at least one hinge clip 25 openable/closable may be arranged in the first body 20, thereby controlling at least the partial region of the second body 30 when the second body 30 is piled on the first body 20 in a manner that the second body 30 is overlapped with the first body 20. According to an embodiment of the present disclosure, it is desirable that a facing region of the second body 30 is accommodated on the first body 20. Accordingly, the hinge clip 25 and the holder recess 24 may be located in directions of facing each other. According to an embodiment of the present disclosure, at least one damper 212 may be further installed in the mounting surface 211 of the first body 20. According to an embodiment of the present disclosure, the damper 212 may support the second body 30 mounted on the first body 20, thereby damping external impact against the first body 20.

According to various embodiments of the present disclosure, the first body 20 may be configured in a manner that a front case frame 21 and a rear case frame 22 are combined with each other. According to an embodiment of the present disclosure, the front case frame 21 is used as the mounting surface 211 for accepting the second body 30, and the rear case frame 22 may contribute as one part of an appearance of the first body 20 and may provide a space for mounting the hinge clip 25.

According to various embodiments of the present disclosure, the hinge clip 25 may be opened/closed at certain angles, and may be configured to be pressurized in an opening direction and a closing direction on a basis of certain inflection angles. According to an embodiment of the present disclosure, when the hinge clip 25 is closed, the hinge clip 25 may pressurize one part of an external surface of the mounted second body 30 in a manner of overlapping on the top of the second body 30, thereby preventing the release of the second body 30.

According to various embodiments of the present disclosure, the second body 30 may be a portable electronic device such as a tablet PC including the display 31. According to an embodiment of the present disclosure, at least one electronic component 32 may be further installed around the display 31. According to an embodiment of the present disclosure, this electronic component 32 may include at least one of a speaker module, a microphone module, a camera module, various kinds of sensor modules, an antenna module, a key button assembly, various kinds of physical interface modules, and the like.

According to various embodiments of the present disclosure, the first body 20 may be an accessory keyboard device including a plurality of key buttons. According to an embodiment of the present disclosure, the second body 30 may be a tablet device electrically connected with the accessory keyboard and used. According to an embodiment of the present disclosure, the tablet device may be used single without the accessory keyboard.

According to various embodiments of the present disclosure, at least one of synthetic resin, complex material, metal, leather, and rubber materials may be added to or be formed in appearance surfaces of the first body 20 and second body 30 and facing surfaces thereof.

Figure 3:
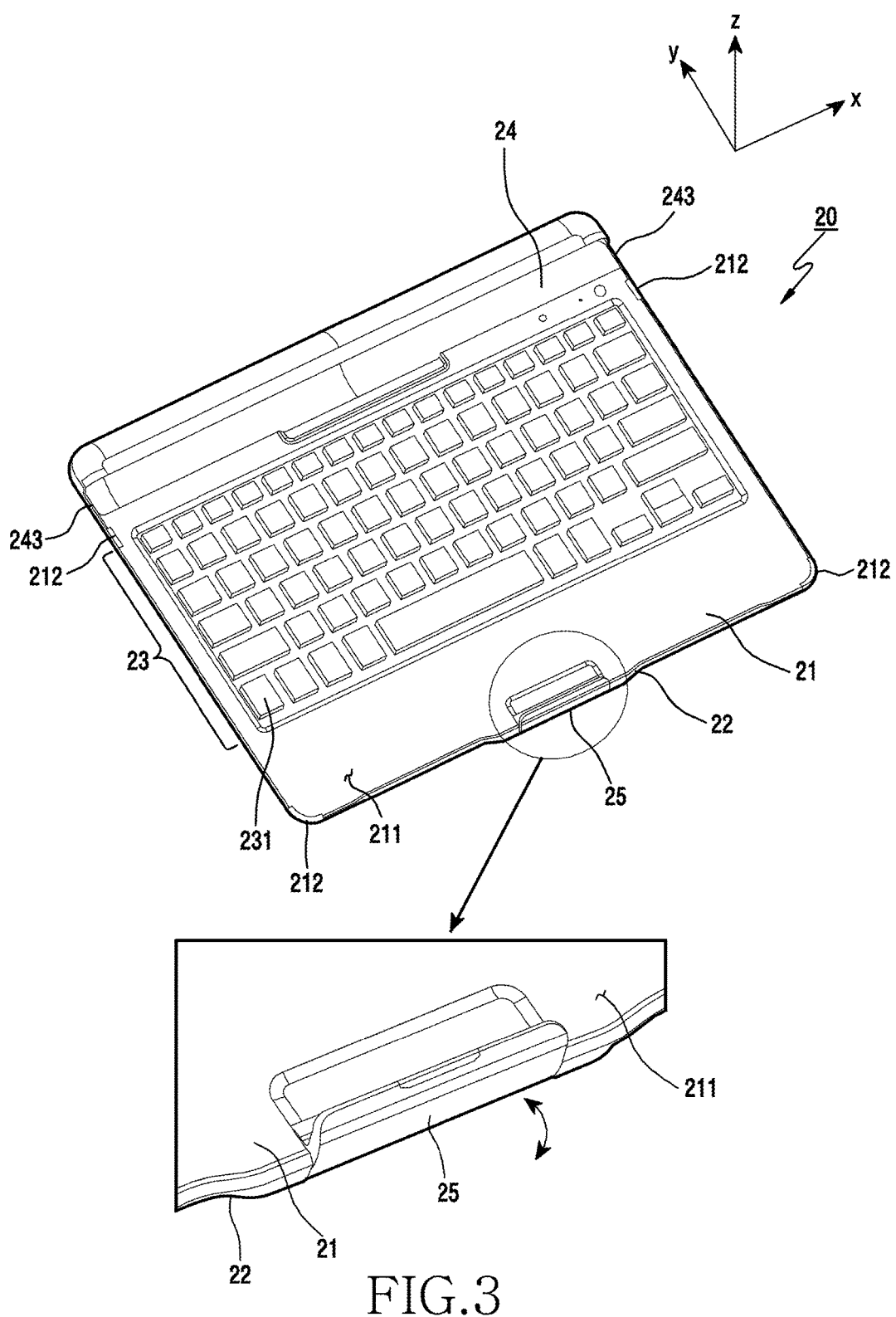
FIG. 3 is a perspective diagram illustrating a first body of an electronic device according to an embodiment of the present disclosure.

FIG. 3 is a perspective diagram illustrating a first body of an electronic device according to an embodiment of the present disclosure.

Referring to FIG. 3, a first body 20 is illustrated, where the first body 20 may be formed in a manner that an upper case frame 21 and a lower case frame 22 are combined with each other. The upper case frame 21 may provide a mounting surface 211 on which the second body 30, as illustrated in FIG. 2A, may be mounted. The upper case frame 21 may include a key button assembly 23 including a plurality of key buttons 231 that are used as a data input means. Further, the first body 20 may include at least one damper 212 installed in the mounting surface 211.

According to various embodiments of the present disclosure, the upper case frame 21 may include a holder recess 24 for holding the second body 30. According to an embodiment of the present disclosure, the holder recess 24 may be configured such that at least a partial region of a bottom surface of the holder recess 24 is formed to have a curved shape, and induces rotation of the second body 30 under the guidance of the holder recess 24. This construction may implement an operation of holding the second body 30 by only an operation of rotating the second body 30 centering on a portion of the second body 30 inserted into the holder recess 24, in addition to a construction of fully detaching the second body 30 from the first body 20 and then again holding the second body 30 in the holder recess 24. This construction may provide a user with an experience felt as if the user opens a cover of a notebook computer.

According to various embodiments of the present disclosure, if the second body 30 is mounted in a manner that the second body 30 is overlapped with the first body 20, the holder recess 24 may provide a space (2411 of FIG. 9C) capable of accepting one part of the second body 30 in a Y-axis direction. Accordingly, the holder recess 24 may combine roles of holding the second body 30 at certain angles and concurrently, controlling one part of the second body 30 when the second body 30 is mounted on the first body 20.

According to various embodiments of the present disclosure, guide ribs 243 may be extended from both ends of the holder recess 24 in an up direction, thereby preventing the second body 30 rotating using the holder recess 24 (i.e., centering on the holder recess 24) from being released in an X-axis direction.

According to various embodiments of the present disclosure, an openable/closable (i.e., rotatable) hinge clip 25 may be installed in a bottom part of the first body 20. According to an embodiment of the present disclosure, the hinge clip 25 may operate to be opened/closed in the illustrated arrow direction, and may be pressurized in an opening direction and a closing direction on a basis of certain inflection angles. Accordingly, when the second body 30 is mounted on the first body 20, the hinge clip 25 may be shut as illustrated and support a partial region of the second body 30.

Figure 4A:
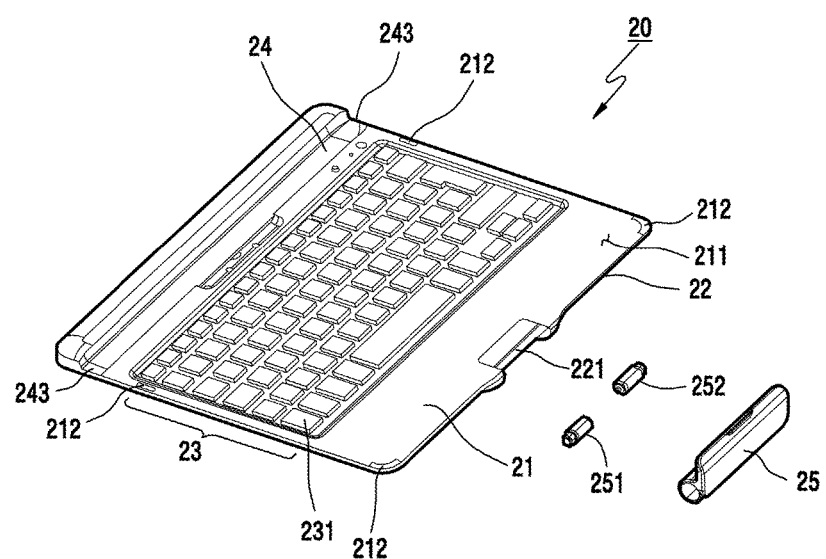
FIGS. 4A, 4B, and 4C are diagrams illustrating a state in which a hinge clip is installed in a first body according to various embodiments of the present disclosure.
Figure 4B:
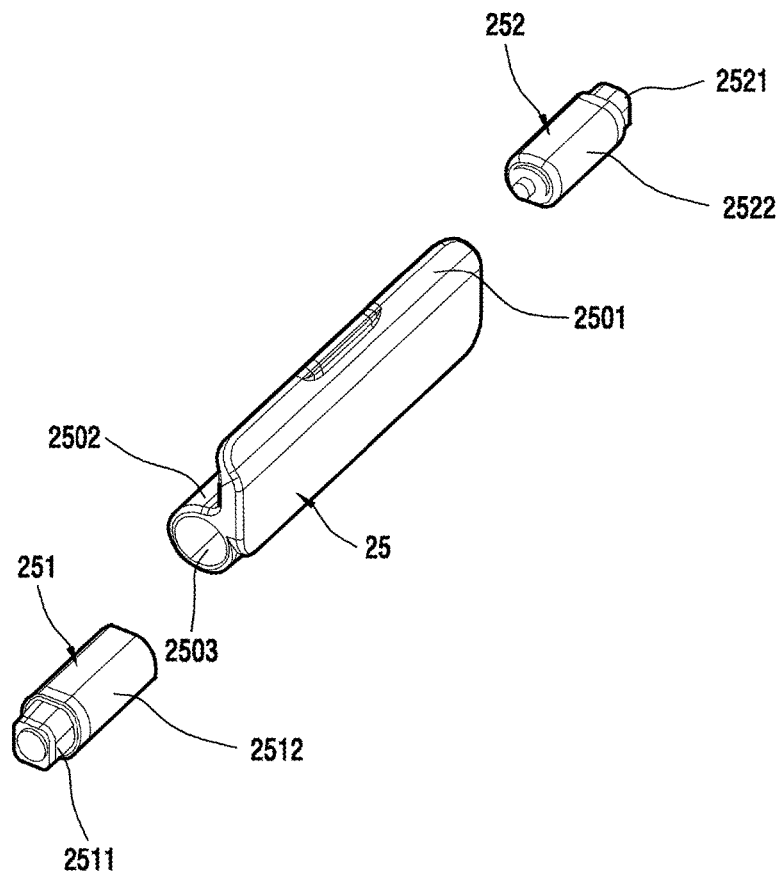
Figure 4C:
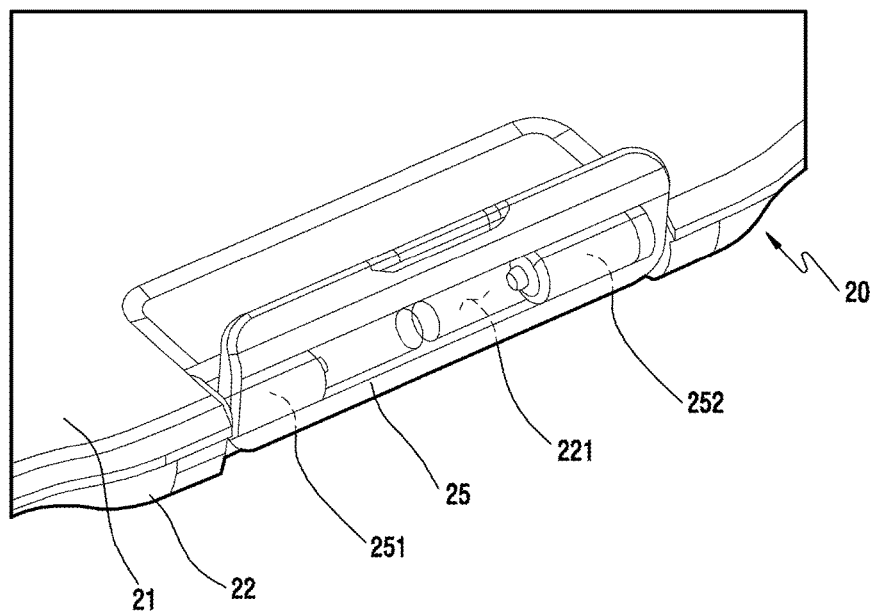

FIGS. 4A, 4B, and 4C are diagrams illustrating a state in which a hinge clip is installed in a first body according to various embodiments of the present disclosure.

Referring to FIG. 4A, a first body 20 is illustrated, where the first body 20 may include a hinge clip 25, a hinge clip mounting part 221, such that the hinge clip 25 is mounted on a bottom part thereof.

According to an embodiment of the present disclosure, the hinge clip mounting part 221 may be installed in a lower case frame 22 of the first body 20. But, this does not intend to limit the scope of the present disclosure, and may be also installed in an upper case frame 21 of the first body 20. According to an embodiment of the present disclosure, hinge cam modules 251 and 252 for providing a pressurization force to the hinge clip 25 in an opening direction or a closing direction may be interposed between the hinge clip 25 and the hinge clip mounting part 221. According to an embodiment of the present disclosure, the hinge clip 25 may be also divided and installed by certain portions of the upper case frame 21 and the lower case frame 22. According to an embodiment of the present disclosure, the hinge clip 25 may be fixed to the upper and lower case frames 21 and 22 in a form of a module fixed to a separately provided fixing piece.

According to various embodiments of the present disclosure, the upper case frame 21 may include a holder recess 24 for holding the second body 30, as illustrated in FIG. 2A. Additionally, the first body 20 may include guide ribs 243, at least one damper 212, a key assembly 23 including at least one key button 231 and a mounting surface 211.

Referring to FIGS. 4B and 4C, a hinge clip 25 is illustrated, where the hinge clip 25 may include a cylindrical hinge arm 2502 and a pressurization fragment 2501. The cylindrical hinge arm 2502 has hinge holes 2503 for accepting the hinge cam modules 251 and 252 at both ends. The pressurization fragment 2501 is extended from the hinge arm 2502 and pressurizes the second body 30, as illustrated in FIG. 2A, by a closing operation.

According to an embodiment of the present disclosure, the hinge cam modules 251 and 252 may be implemented in a manner that rotatable hinge cams 2511 and 2521 protrude outside of bodies 2512 and 2522. According to an embodiment of the present disclosure, these hinge cam modules 251 and 252 may be configured in a manner of including at least one part of a hinge module construction of a Korean patent application filed by the present applicant on Dec. 17, 2002 in the Korean Intellectual Property Office and assigned Serial number 10-2002-0080529. According to an embodiment of the present disclosure, the body 2512 of the hinge cam module 251 may be fixed to the hinge hole 2503 provided in the cylindrical hinge arm 2502 of the hinge clip 25, and the hinge cam 2511 of the hinge cam module 251 may be fixed to a hinge cam mounting part 221 of a first body 20 including an upper case frame 21 and a lower case frame 22. The other hinge cam module 252 may be also fixed to the hinge clip 25 in the same manner. Accordingly, when the hinge clip 25 is rotated, the body 2512 of the hinge cam module 251 may be rotated together, and the hinge cam 2511 may continuously maintain its own state without rotation. According to an embodiment of the present disclosure, the hinge clip 25 may also implement an automatic opening/closing operation using a spring (e.g., a coil spring, a plate spring and the like) in addition to the hinge cam modules 251 and 252.

Figure 5A:
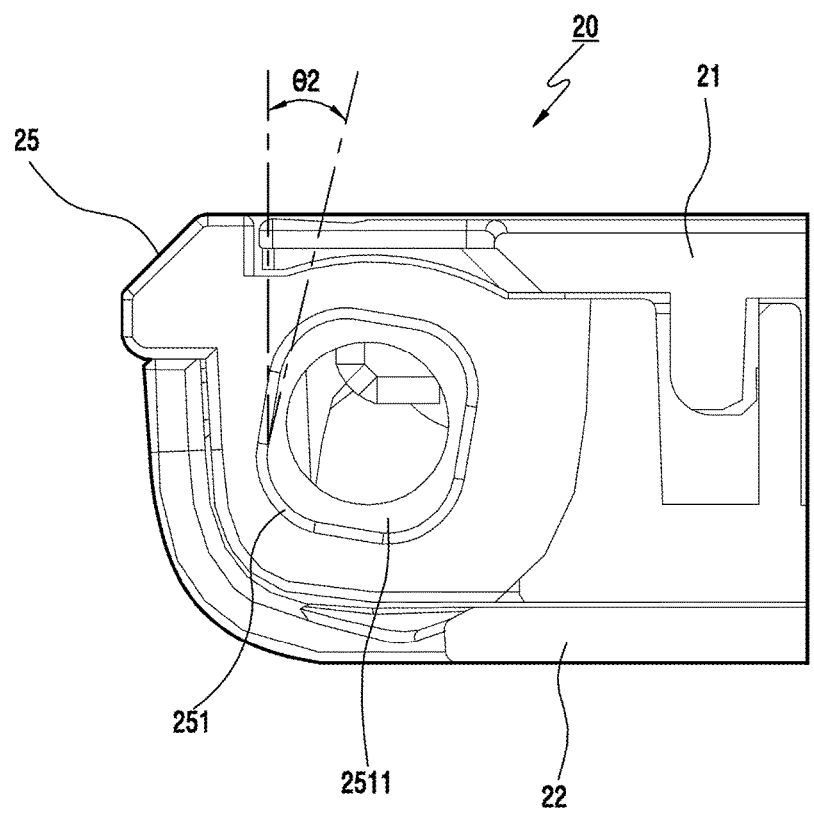
FIGS. 5A. 5B, and 5C are diagrams illustrating a state in which a second body is installed after a hinge clip is installed in a first body according to various embodiments of the present disclosure.
Figure 5B:
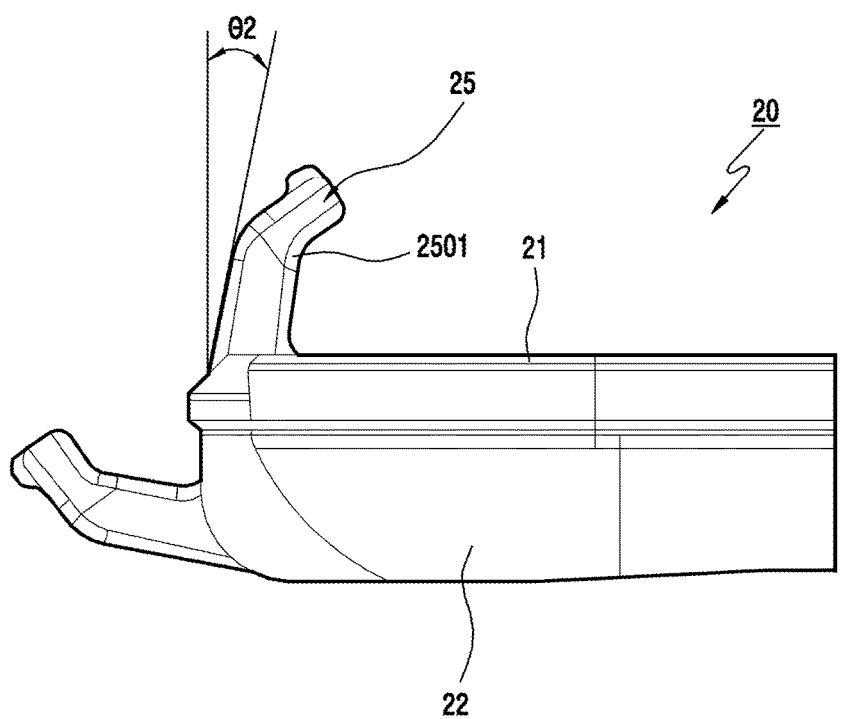
Figure 5C:
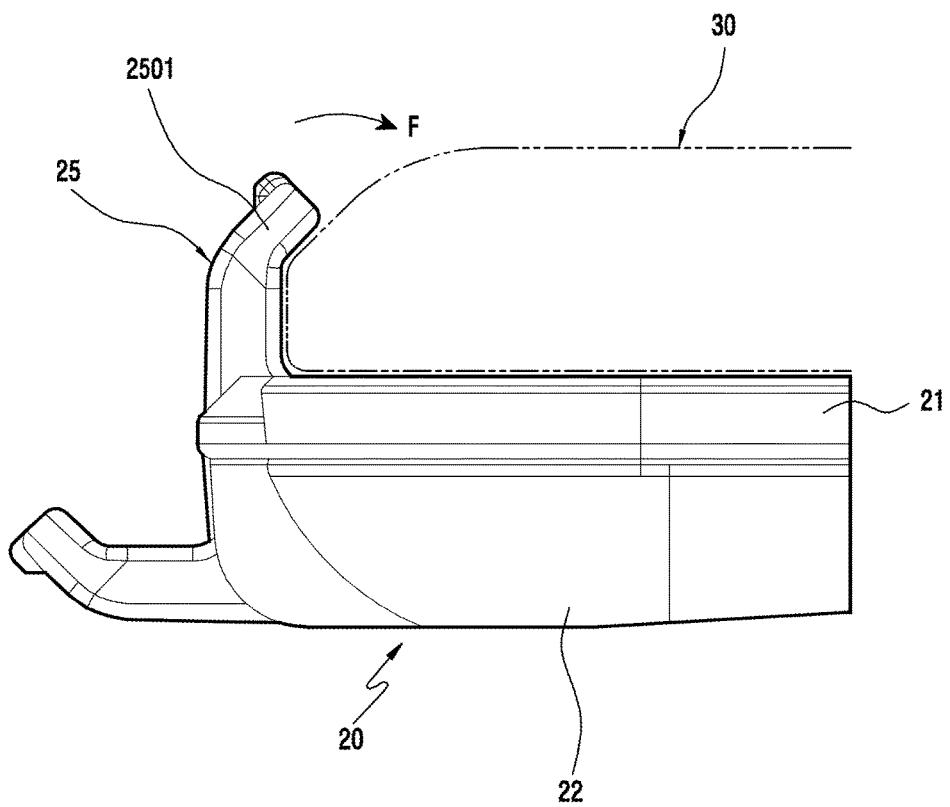

FIGS. 5A, 5B, and 5C are diagrams illustrating a state in which a second body is installed after a hinge clip is installed in a first body according to various embodiments of the present disclosure.

Referring to FIGS. 5A to 5C, a first body 20 and a second body 30 are illustrated, where the first body 20 may include an upper case frame 21, a lower case frame 22, a hinge clip 25, a hinge cam 2511 and a hinge cam module 251, such that the hinge cam module 251 may be installed at certain angles (θ2) and have a certain pressurization force (F) in a closing direction of the hinge clip 25. According to an embodiment of the present disclosure, the above angles (θ2) may be set within a range of 0 degree to 20 degrees. According to an embodiment of the present disclosure, this pressurization force (F) may increase an initial clamping force of the hinge clip 25 and, after rotation, also prevent automatic closing unwanted by a user.

Referring to FIG. 5B, in a state in which the second body 30 is not mounted on the first body 20, when the hinge clip 25 is closed, a pressurization fragment 2501 of the hinge clip 25 may maintain a state of being more rotated by angles (θ2) toward the first body 20. Referring to FIG. 5C, in a state in which the second body 30 is mounted and overlapped with the first body 20, the pressurization fragment 2501 of the hinge clip 25 retains a certain pressurization force and becomes a retreated state. By the advancing pressurization force (F) of the pressurization fragment 2501, the second body 30 may be firmly accommodated without being released from the first body 20.

Figure 6A:
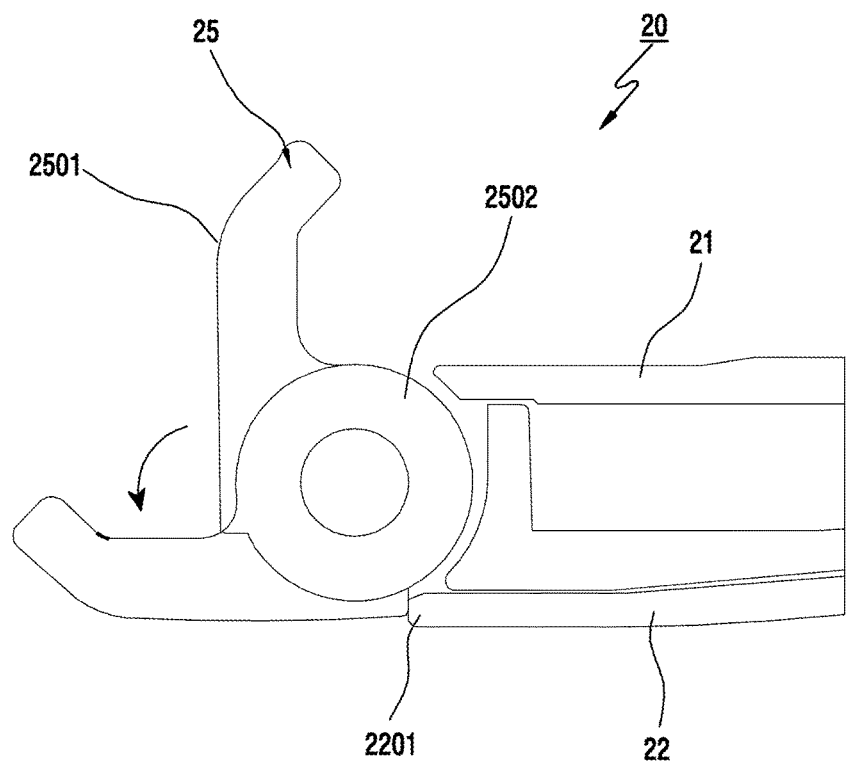
FIGS. 6A and 6B are diagrams illustrating a state in which a maximum opening position of a hinge clip is accommodated according to various embodiments of the present disclosure.
Figure 6B:
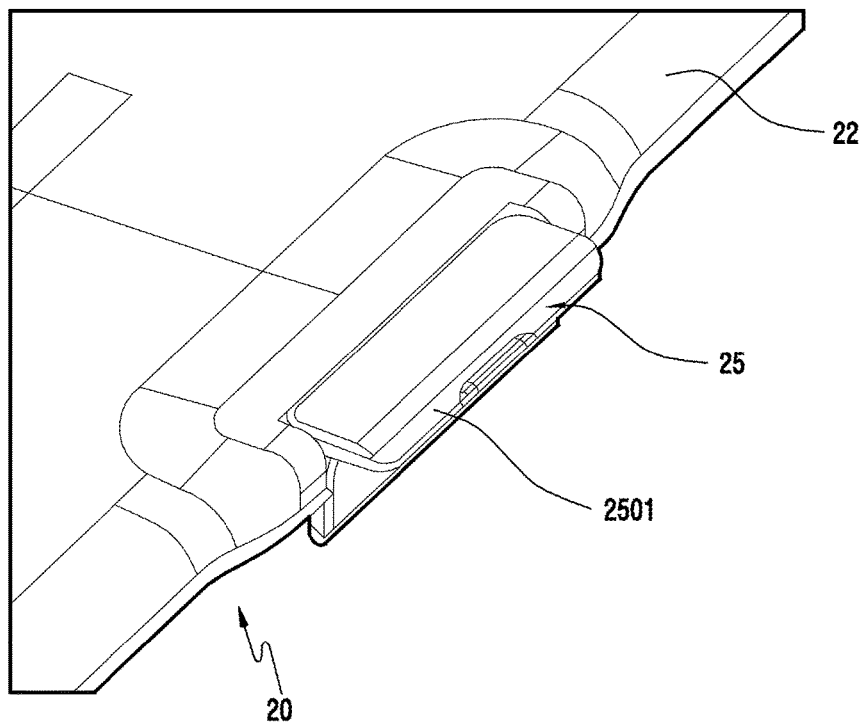

FIGS. 6A and 6B are diagrams illustrating a state in which a maximum opening position of a hinge clip is accommodated according to various embodiments of the present disclosure.

Referring to FIGS. 6A and 6B, a hinge clip 25 is illustrated, where the hinge clip 25 may be installed to be rotated in a direction of being openable/closable with respect to a first body 20 including an upper case frame 21, a lower case frame 22 and a cylindrical hinge arm 2502.

However, the hinge clip 25 may be needed to be stopped in a suitable opening position because the hinge clip 25 is pressurized in the opening direction by the hinge cam module. This stopper structure may be implemented by a first catching part 2201 formed at an end of the lower case frame 22. According to an embodiment of the present disclosure, the first catching part 2201 capable of catching a pressurization fragment 2501 of the hinge clip 25 when the hinge clip 25 is fully opened is formed at the lower case frame 22 of the first body 20, thereby preventing an excessive rotation operation of the hinge clip 25. According to an embodiment of the present disclosure, a maximum opening position of the hinge clip 25 is a position enough for the pressurization fragment 2501 and a rear surface of the first body 20 to maintain a parallel state. It is desirable that the hinge clip 25 is no longer rotated to the rear.

Figure 7A:
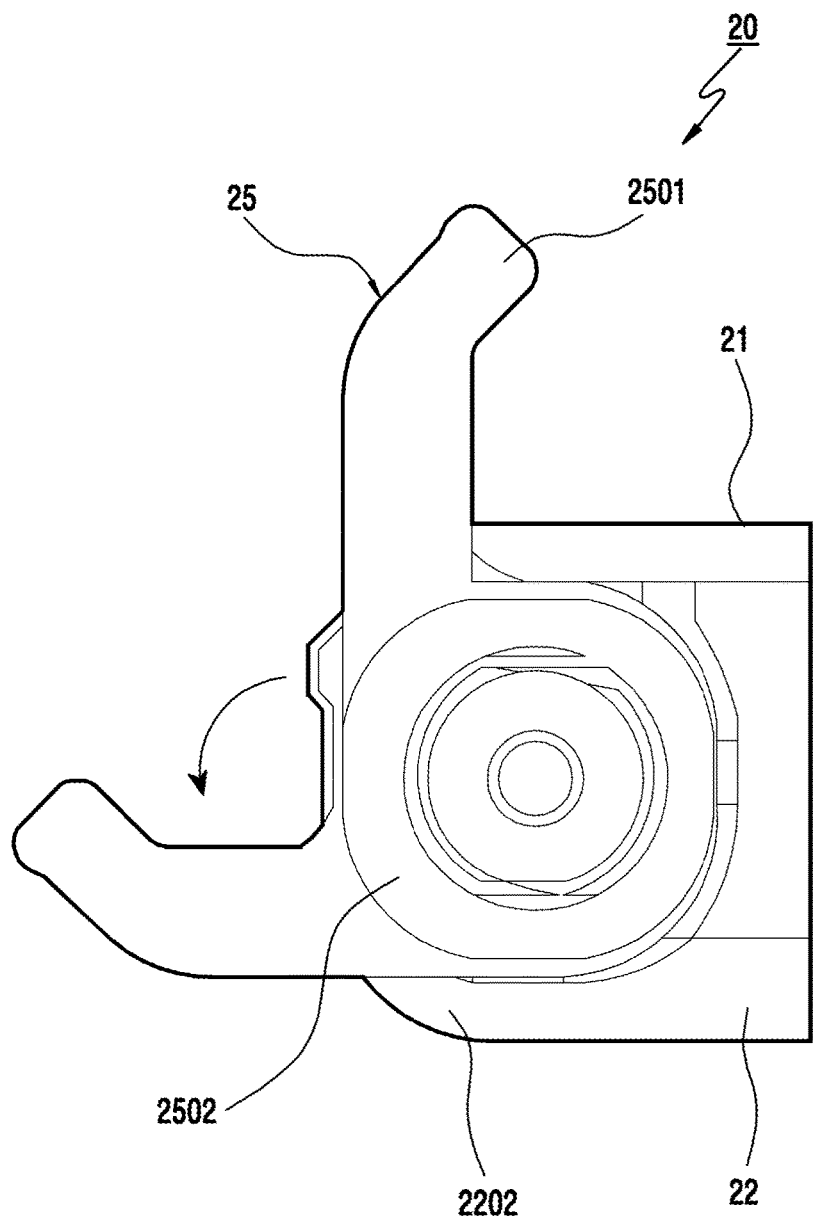
FIGS. 7A and 7B are diagrams illustrating a state in which a maximum opening position of a hinge clip is accommodated according to various embodiments of the present disclosure.
Figure 7B:
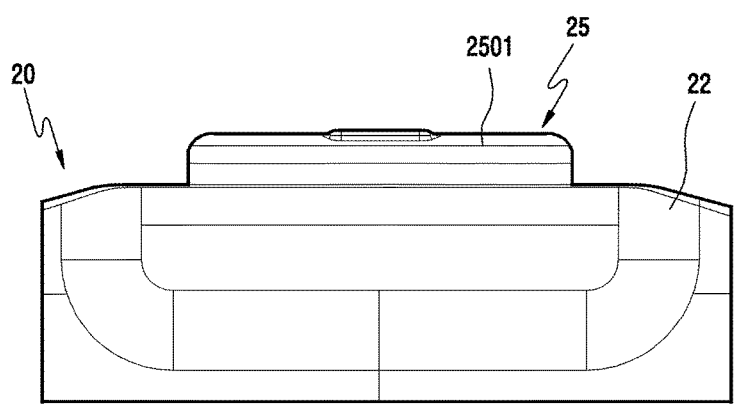

FIGS. 7A and 7B are diagrams illustrating a state in which a maximum opening position of a hinge clip is accommodated according to various embodiments of the present disclosure.

Referring to FIGS. 7A and 7B, a hinge clip 25 is illustrated, where the hinge clip 25 may be installed to be rotated in a direction of being openable/closable with respect to a first body 20 including an upper case frame 21, a lower case frame 22, a pressurization fragment 2501, a second catching part 2202, and a cylindrical hinge arm 2502.

However, the hinge clip 25 may be needed to be stopped in a suitable opening position because the hinge clip 25 is pressurized in the opening direction by the hinge cam module. This stopper structure may be implemented by the second catching part 2202 formed at an end of the lower case frame 22. According to an embodiment of the present disclosure, the second catching part 2202 capable of catching the pressurization fragment 2501 of the hinge clip 25 in a position determined that the hinge clip 25 is fully opened is formed at the lower case frame 22 of the first body 20, thereby preventing an excessive rotation operation of the hinge clip 25. According to an embodiment of the present disclosure, the maximum opening position of the hinge clip 25 is a position enough for the pressurization fragment 2501 and a rear surface of the first body 20 to maintain a parallel state. It is desirable that the hinge clip 25 is no longer rotated to the rear.

According to various embodiments of the present disclosure, FIGS. 6A and 6B show a state in which the pressurization fragment 2501 of the hinge clip 25 is fully exposed from the rear surface of the first body 20, and FIGS. 7A and 7B show a state in which the pressurization fragment 2501 of the hinge clip 25 is partially exposed from the rear surface of the first body 20. FIGS. 6A to 7B may be applied in various manners in accordance with a design of the first body 20.

Figure 8:
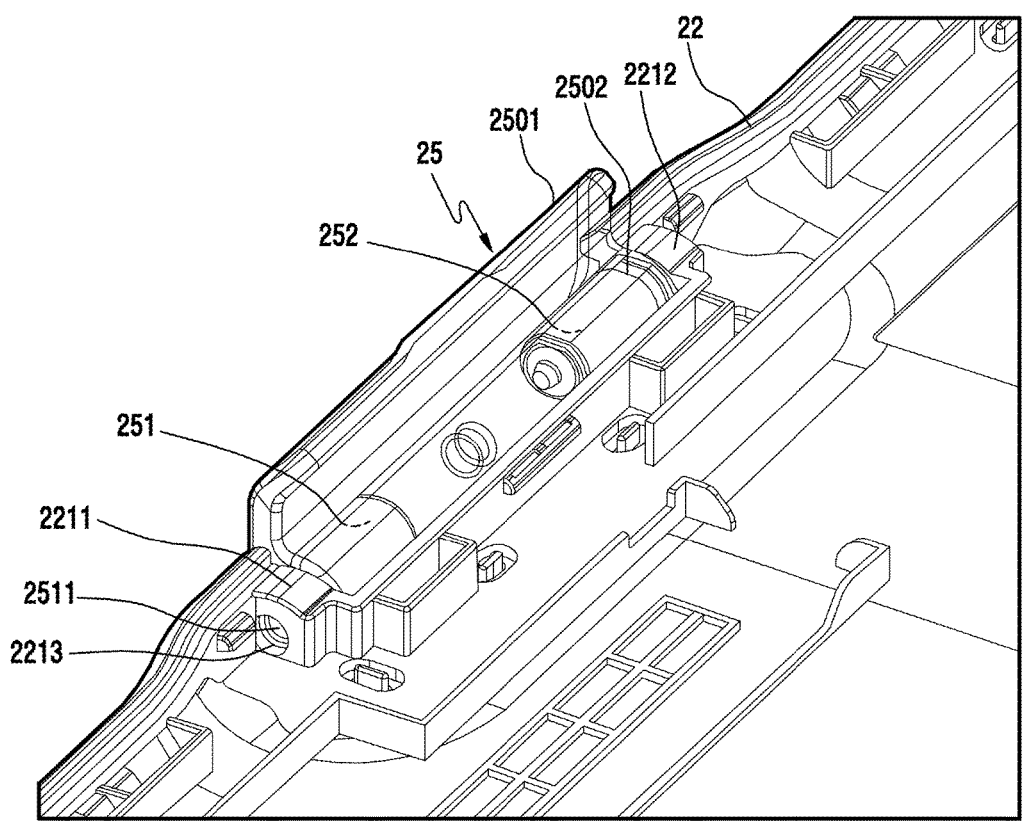
FIG. 8 is a diagram illustrating a state in which a hinge clip is installed in a lower case frame of a first body according to an embodiment of the present disclosure.

FIG. 8 is a diagram illustrating a state in which a hinge clip is installed in a lower case frame of a first body according to an embodiment of the present disclosure.

Referring to FIG. 8, a hinge clip 25 is illustrated, where the hinge clip 25 may include a pressurization fragment 2501, a cylindrical hinge arm 2502, a hinge cam fixing part 2211 formed in a lower case frame 22 of the first body 20, as illustrated in FIG. 2A, and an opening 2213 for inserting a hinge cam 2511 of a hinge cam module 251.

According to an embodiment of the present disclosure, the hinge cam 2521, as illustrated in FIG. 4B, of a hinge cam module 252 may be also combined in the same manner to a hinge cam fixing part 2212 formed in the lower case frame 22. According to an embodiment of the present disclosure, the hinge cam fixing part 2211 may accept the hinge cam 2511 protruded from the hinge clip 25, and the hinge cam fixing part 2211 may be mounted such that the hinge clip 25 is rotated centering on the hinge cam 2511. According to an embodiment of the present disclosure, the hinge cam 2511 is mounted in a manner of passing through the opening 2213. By doing so, if the hinge cam 2511 is pressurized through the opening 2213 toward the hinge clip 25, the hinge clip 25 may be separated from the first body 20. This easy separation structure may be advantageously applied when the hinge clip 25 is destroyed or is needed to be replaced.

Figure 9A:
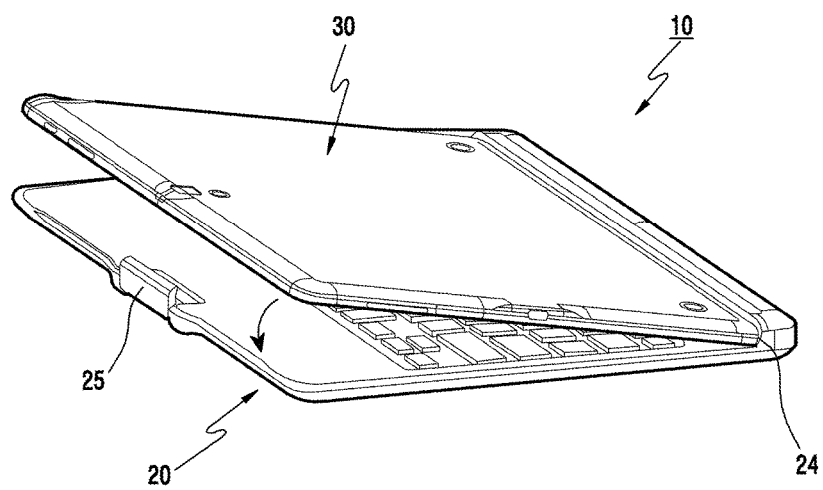
FIGS. 9A, 9B, and 9C are diagrams illustrating a state in which a second body is mounted on a first body according to various embodiments of the present disclosure.
Figure 9B:
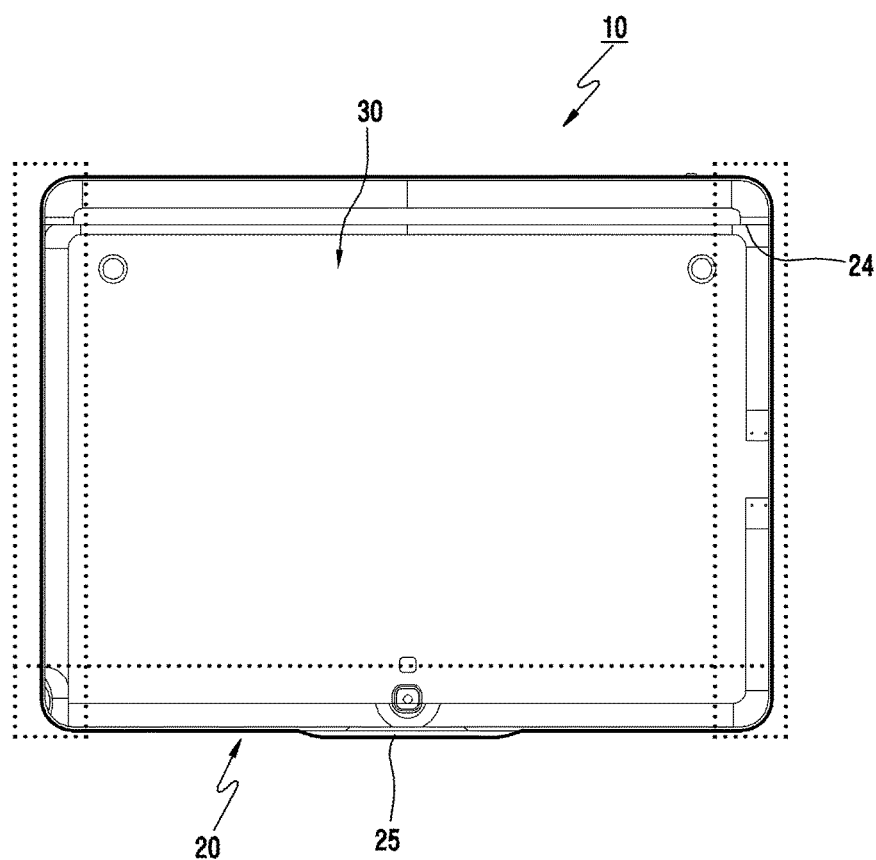
Figure 9C:
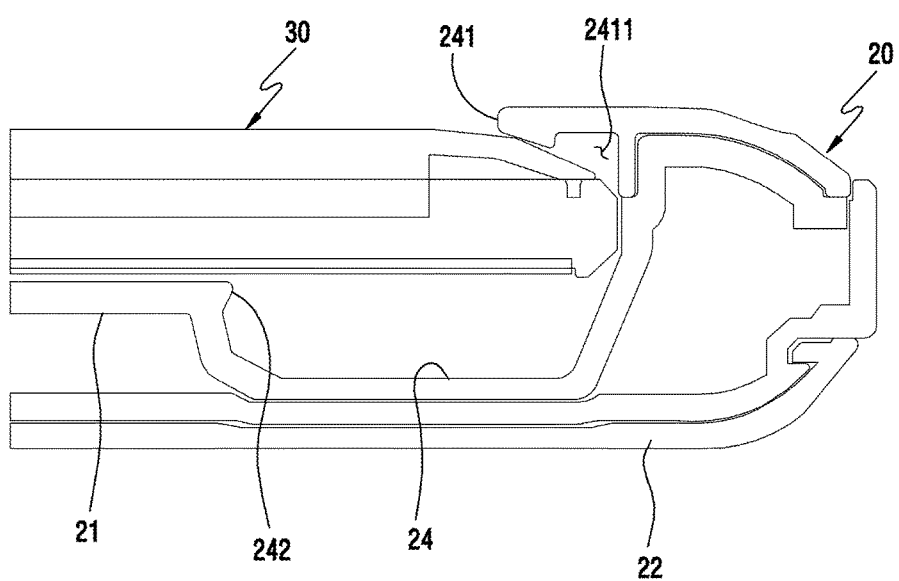

FIGS. 9A, 9B, and 9C are diagrams illustrating a state in which a second body is mounted on a first body according to various embodiments of the present disclosure.

Referring to FIGS. 9A to 9C, an electronic device 10 is illustrated, where the electronic device includes a first body 20 having an upper case frame 21 and a lower case frame 22, a second body 30 a hinge clip 25 and a holder recess 24.

Referring to FIG. 9A, firstly, after one end of the second body 30 is inserted into the holder recess 24 of the first body 20, the other end of the second body 30 may be descended in an arrow direction. After that, when the second body 30 fully gets in contact with the first body 20, the hinge clip 25 may be closed and, as illustrated in FIG. 9C, the other end of the second body 30 may be accommodated by the hinge clip 25.

Referring to FIG. 9B, if combination is completed, the first body 20 and the second body 30 may be combined in a matching manner. Because the combination does not require a separate combining rib and the like, the combination may prevent an unnecessary increase of a volume of the first body 20 for a combining structure.

Referring to FIG. 9C, the holder recess 24 may have a first support part 241 and a second support part 242. According to an embodiment of the present disclosure, the first support part 241 is formed in a manner that the first support part 241 covers at least one part of the second body 30 at an upper part of the holder recess 24 when the second body 30 is mounted on the first body 20. The first support part 241 is formed as described above, thereby providing a mounting space 2411 capable of accepting the second body 30. Because the second body 30 is mounted in the mounting space 2411 of the first support part 241 and is supported by the first support part 241, the second body 30 may be prevented from being released in a vertical direction from the first body 20.

Figure 10A:
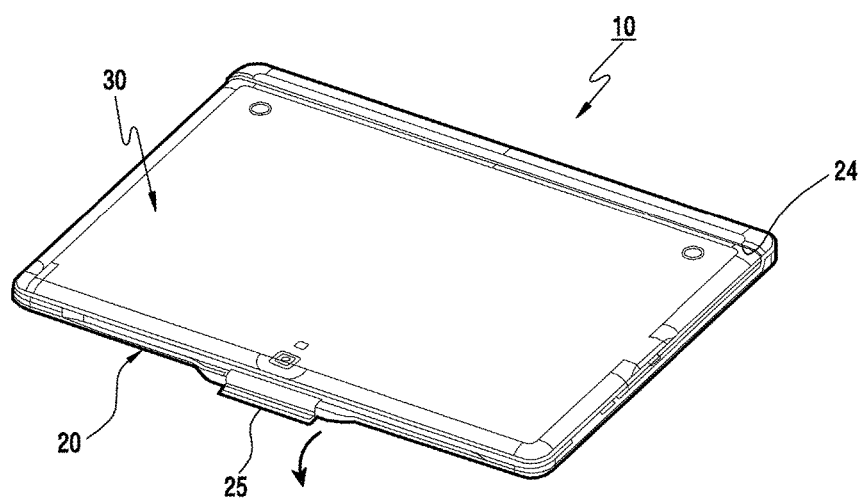
FIGS. 10A, 10B, and 10C are diagrams illustrating a state in which a second body is mounted on a first body according to various embodiments of the present disclosure.
Figure 10B:
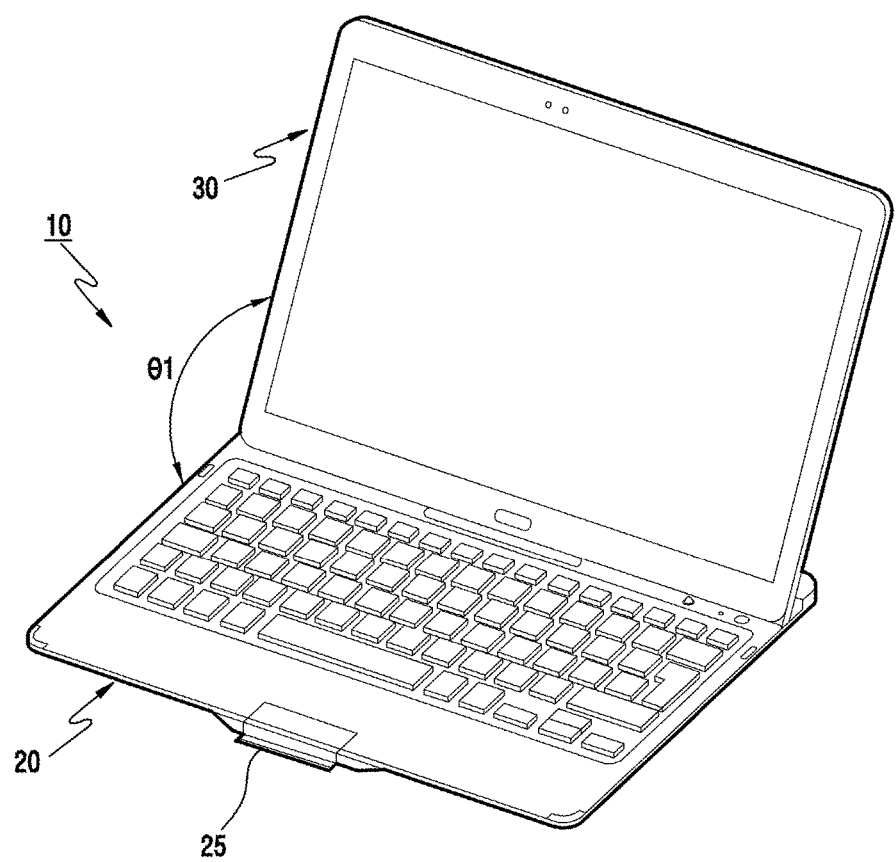
Figure 10C:
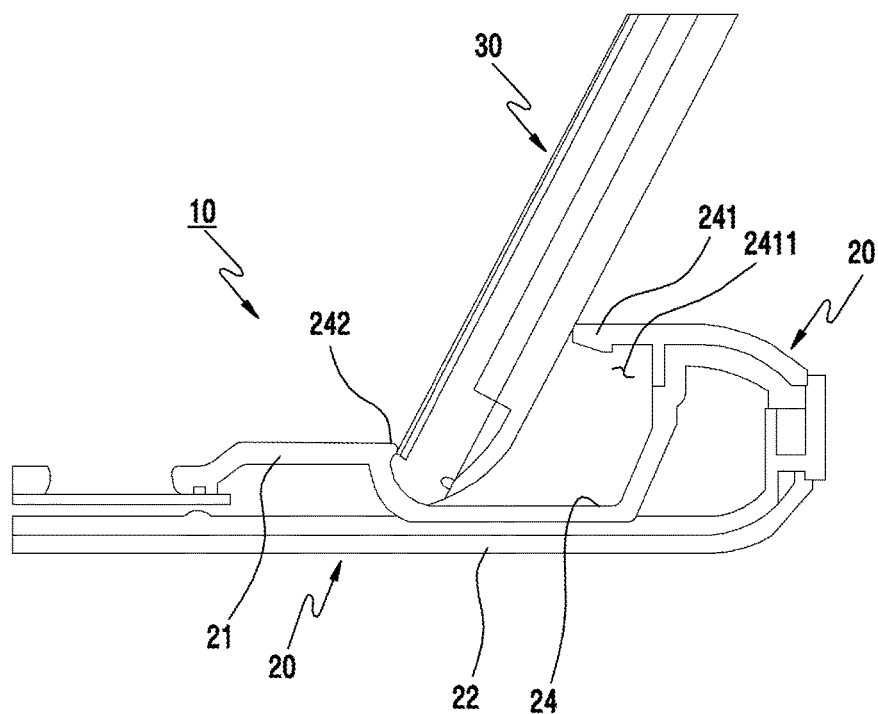

FIGS. 10A, 10B, and 10C are diagrams illustrating a state in which a second body is mounted on a first body according to various embodiments of the present disclosure.

Referring to FIGS. 10A to 10C, an electronic device 10 is illustrated, where the electronic device 10 includes a first body 20 including an upper case frame 21 and a lower case frame 22, a second body 30, a hinge clip 25, and a holder recess 24.

Further, referring to FIGS. 10A and 10B, to detach the second body 30 from the first body 20, the hinge clip 25 may be opened in an arrow direction of FIG. 10A. In this case, when the hinge clip 25 is opened at certain angles or more, the hinge clip 25 may be automatically opened to the maximum opening position of the hinge clip 25. According to an embodiment of the present disclosure, after the hinge clip 25 is opened, if an end of the second body 30 is lifted and rotated centering on the holder recess 24, as illustrated in FIG. 10B, the second body 30 may be held at certain opening/closing angles (θ1) with respect to the first body 20.

According to an embodiment of the present disclosure, as illustrated in FIG. 10C, in this case, the first body 20 may maintain a state in which the second body 30 is supported by a first support part 241 and a second support part 242 and held at certain angles so as to form a mounting space 2411. According to an embodiment of the present disclosure, if the first support part 241 and second support part 242 of the holder recess 24 of the first body 20 are designed to be changed in shape and position, the holding angles of the second body 30 may be changed with respect to the first body 20.

Figure 11A:
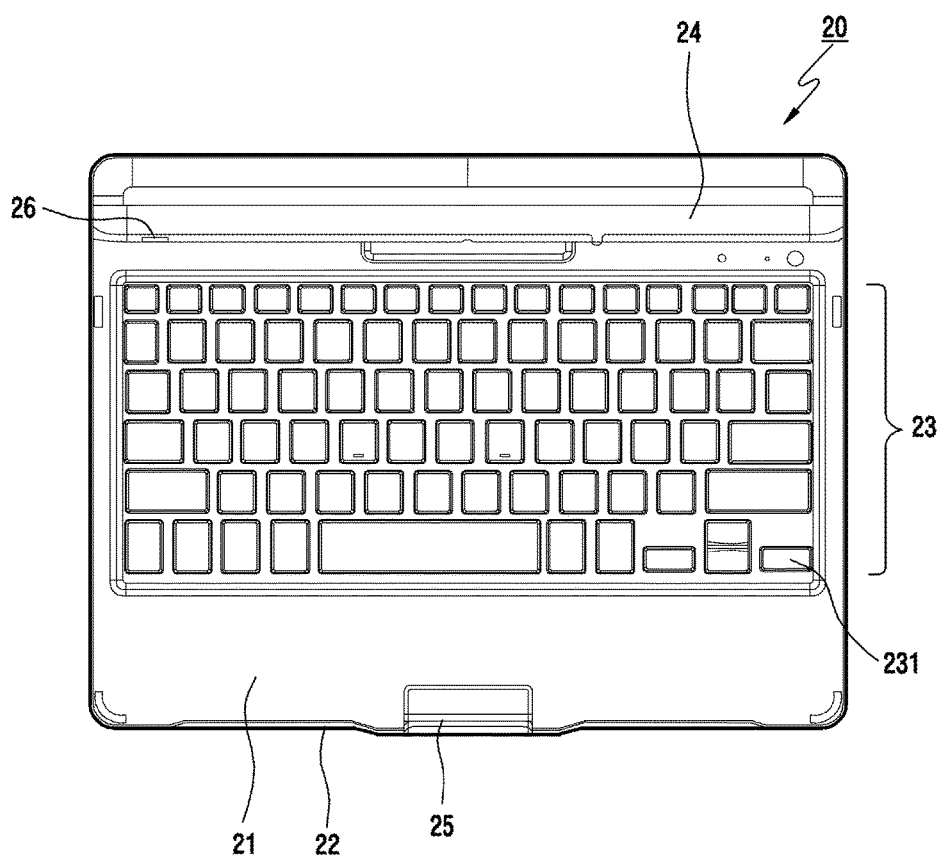
FIGS. 11A and 11B are diagrams illustrating a construction of a first body including a switching means for automatically interworking the first body and a second body according to various embodiments of the present disclosure.
Figure 11B:
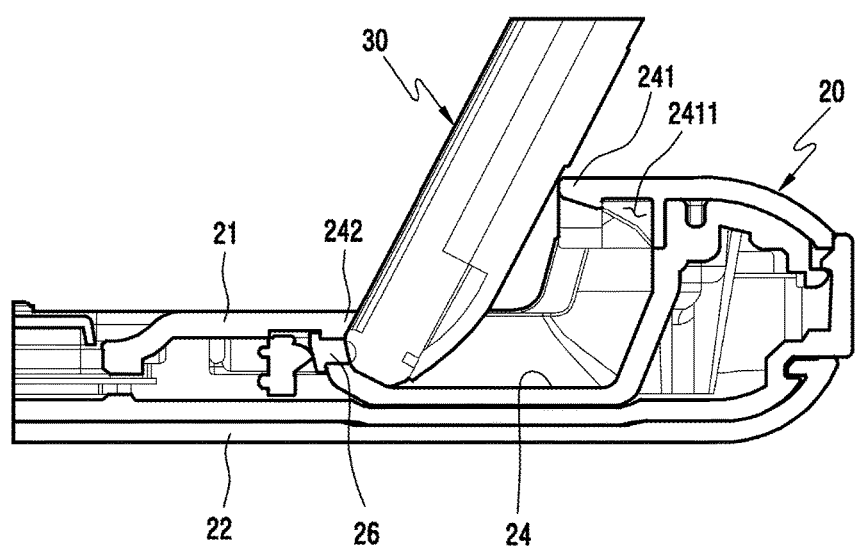

FIGS. 11A and 11B are diagrams illustrating a construction of a first body including a switching means for automatically interworking the first body and a second body according to various embodiments of the present disclosure.

Referring to FIGS. 11A and 11B, a first body 20 and a second body 30 are illustrated, where the first body 20 may include an upper case frame 21, a lower case frame 22, a holder recess 24, a hinge clip 25, a key assembly 23 including at least one key 231, a first support part 241 that can form a mounting space 2411, a second support part 242 and at least one switching means 26 that may be arranged to protrude in a suitable place of the holder recess 24 of the first body 20.

According to an embodiment of the present disclosure, the switching means 26 may sense that the second body 30 is held on the first body 20, and allow the first body 20 and the second body 30 to operatively automatically interwork with each other. According to an embodiment of the present disclosure, the switching means 26 may be protruded within the holder recess 24. The switching means 26 may be the well-known various switching devices able to be physically pressurized by the second body 30 when the second body 30 is held on the first body 20. According to an embodiment of the present disclosure, the switching means 26 may be a tact switch.

According to various embodiments of the present disclosure, this automatic interworking function may include a power saving function of powering On the first body 20 when the second body 30 is held on the first body 20, and powering Off the first body 20 when the second body 30 is detached from the first body 20.

According to an embodiment of the present disclosure, this automatic interworking function may include a function of, when the second body 30 is held on the first body 20, turning On a BT function of the first body 20 and automatically pairing the first body 20 with the second body 30 in a communication possible state and, when the second body 30 is detached from the first body 20, automatically turning Off the BT function of the first body 20. This function may provide a user with a convenience of use of the electronic device and concurrently, prevent the unnecessary power waste of the electronic device of the electronic device.

According to an embodiment of the present disclosure, this automatic interworking function may also include a function of, when the second body 30 is held on the first body 20, turning On a corresponding function of the first body 20, and again interworking a function of the second body 30 in engagement with this. According to an embodiment of the present disclosure, the automatic interwork function may power On/Off the second body 30, or be used for a mode change as well.

Figure 12A:
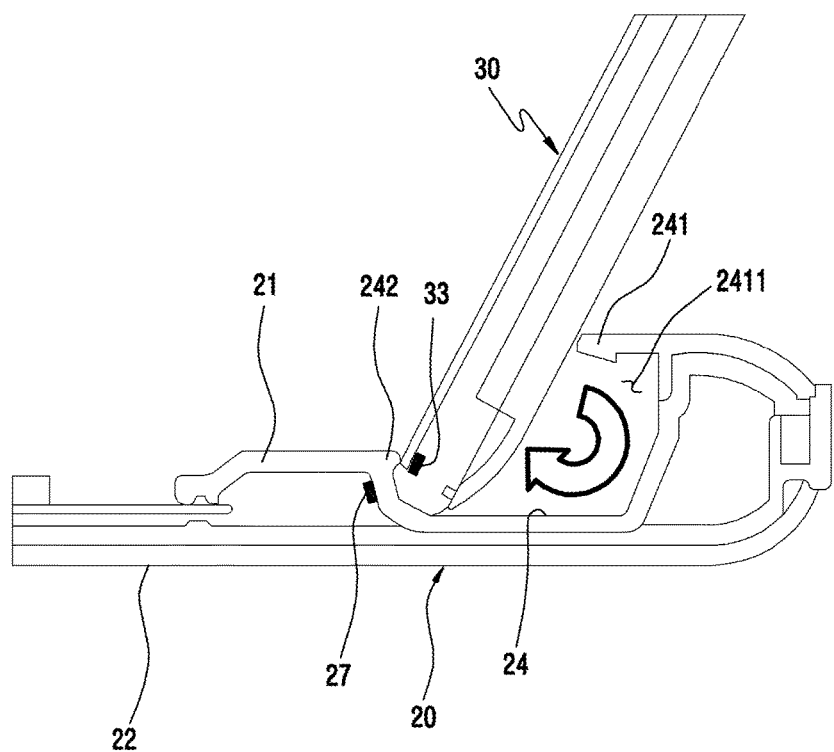
FIGS. 12A, 12B, and 12C are diagrams illustrating a construction of an electronic device including a switching means for automatically interworking a first body and a second body according to various embodiments of the present disclosure.
Figure 12B:
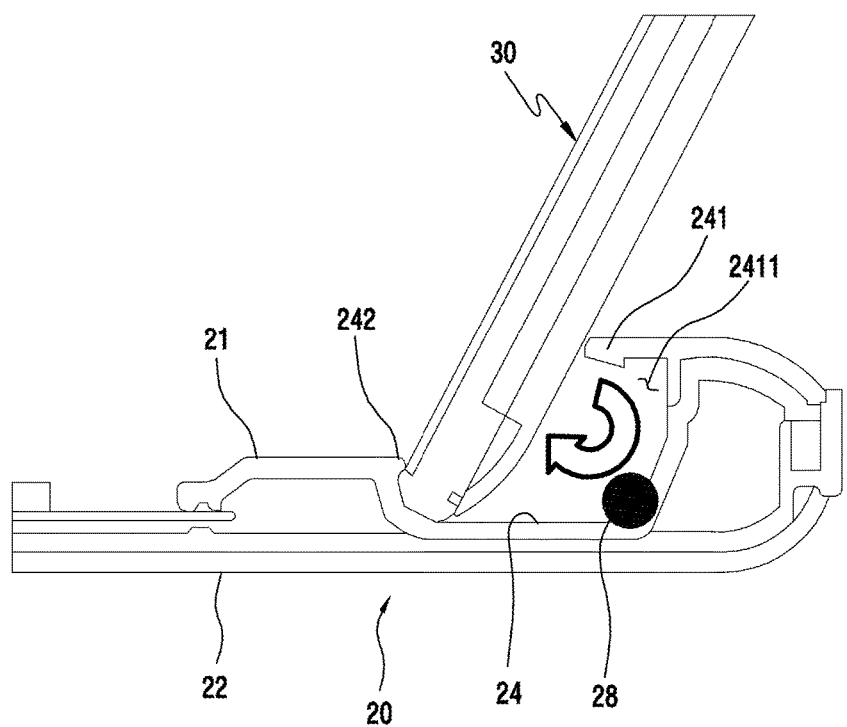
Figure 12C:
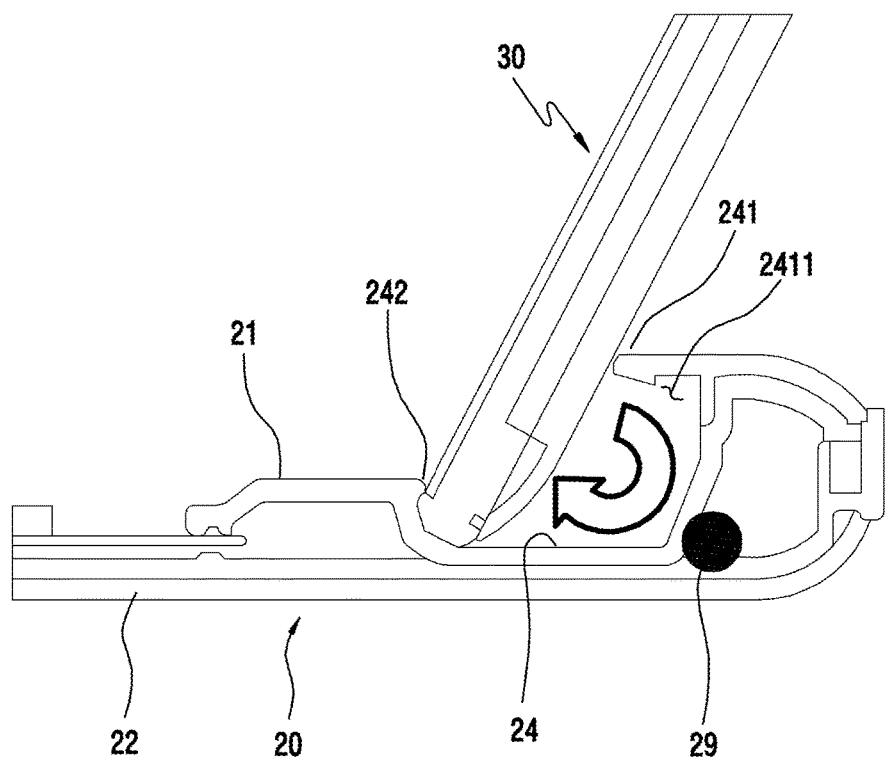

FIGS. 12A, 12B, and 12C are diagrams illustrating a construction of an electronic device including a switching means for automatically interworking a first body and a second body according to various embodiments of the present disclosure.

Referring to FIGS. 12A to 12C, a first body 20 and a second body 30 are illustrated, where the first body 20 may include an upper case frame 21, a lower case frame 22, a holder recess 24, a first support part 241 that can form a mounting space 2411, a second support part 242 and a sensing means (e.g., reference elements 27, 28, 29 and/or 33) for sensing an operation or state of holding the second body 30 on the first body 20.

The sensing means may be a magnet 33 and a magnetic force sensor 27. According to an embodiment of the present disclosure, the magnetic force sensor 27 may be a magnetic read switch, a hall sensor and the like. In this case, the magnetic force sensor 27 may be arranged in the first body 20, and the magnet 33 may be arranged in the second body 30. According to an embodiment of the present disclosure, the magnetic force sensor 27 and the magnet 33 may be arranged in positions in which the magnetic force sensor 27 and the magnet 33 may react with each other when the second body 30 is held on the first body 20. According to an embodiment of the present disclosure, the magnetic force sensor 27 and the magnet 33 may be also implemented to be interchanged in position.

Referring to FIGS. 12B and 12C, the sensing means for sensing a holding of the second body 30 on the first body 20 may be a physical switch 28 or a touch sensor 29. The physical switch 28 or the touch sensor 29 may be also installed in the first body 20. According to an embodiment of the present disclosure, if a state of mounting the second body 30 on the first body 20 is changed into a state of holding the second body 30 with respect to the first body 20, the physical switch 28 and/or the touch sensor 29 may sense this state change, thereby being also capable of performing the aforementioned corresponding functions.

According to various embodiments of the present disclosure, the switching means or sensing means is arranged within a movement region of the holder recess 24, in which the second body 30 performs an opening/closing operation. By this arrangement, the switching means or sensing means may detect a final opening or closing state of the second body 30 and, even during an opening or closing operation, detect this opening or closing operation or state, and use the detection result for utilization of more various functions of the electronic device.

Figure 13A:
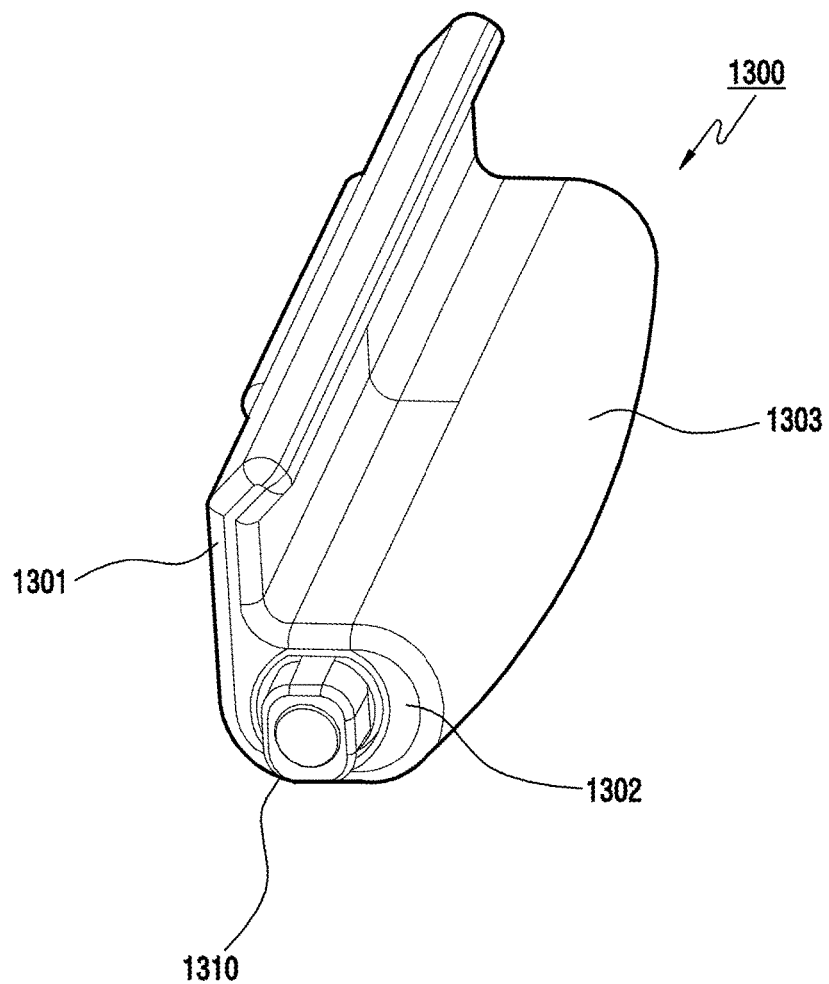
FIG. 13A is a perspective diagram illustrating a hinge clip according to an embodiment of the present disclosure.

FIG. 13A is a perspective diagram illustrating a hinge clip according to an embodiment of the present disclosure.

Referring to FIG. 13A, a hinge clip 1300 is illustrated, where the hinge clip 1300 may include a hinge arm 1302, and a pressurization part 1301 extended from the hinge arm 1302. A hinge cam module 1310 may be installed in the hinge arm 1302. According to an embodiment of the present disclosure, a curved part 1303 may be formed to protrude outside at a central portion of the hinge arm 1302.

Figure 13B:
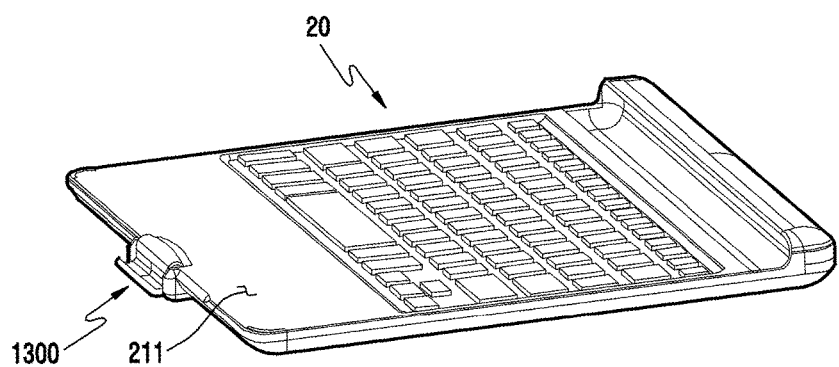
FIG. 13B is a perspective diagram illustrating a first body applying a hinge clip according to an embodiment of the present disclosure.
Figure 13C:
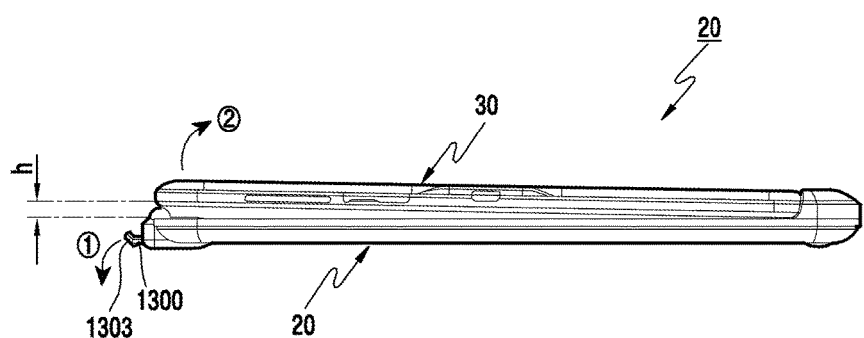
FIG. 13C is a diagram illustrating a state in which a second body is detached from a first body by a hinge clip according to an embodiment of the present disclosure.

FIG. 13B is a perspective diagram illustrating a first body applying a hinge clip according to an embodiment of the present disclosure. FIG. 13C is a diagram illustrating a state in which a second body is detached from a first body by a hinge clip according to an embodiment of the present disclosure.

Referring to FIGS. 13B and 13C, a first body 20 and a second body 30 are illustrated, where the first body 20 may include a mounting surface 211 and a hinge clip 1300.

After the hinge clip 1300 is installed to be rotatable with respect to the first body 20, if the hinge clip 1300 is opened, a curved part 1303 may be rotated to protrude upward. According to an embodiment of the present disclosure, the hinge clip 1300 may be installed in a manner that the curved part 1303 of the hinge clip 1300 is protruded higher than the mounting surface 211 of the first body 20.

Accordingly, as illustrated in FIG. 13C, in a state in which the first body 20 and the second body 30 are overlapped and combined with each other, if the hinge clip 1300 is opened, the second body 30 may be pushed and lifted as much as a height (h) by the curved part 1303, thereby providing a space enough for a user to conveniently detach the second body 30 from the first body 20.

According to various embodiments of the present disclosure, though not illustrated, the curved part 1303 may be designed and configured in a shape of being asymmetric and the like on a basis of a rotation axis. By this design, if the hinge clip 1300 is opened, the curved part 1303 of the hinge clip 1300 lifts the second body 30, and rotational force acts on the curved part 1303 of the hinge clip 1300 by only an operation of pressing the second body 30 such that the second body 30 may be automatically accommodated by the hinge clip 1300.

According to various embodiments of the present disclosure, a detachable electronic device may not only facilitate the mounting and holding of the electronic device by only a self-structure and a hinge clip but also prevent an increase of the whole volume of the electronic device caused by the combination structure, and improve product reliability.

Figure 14:
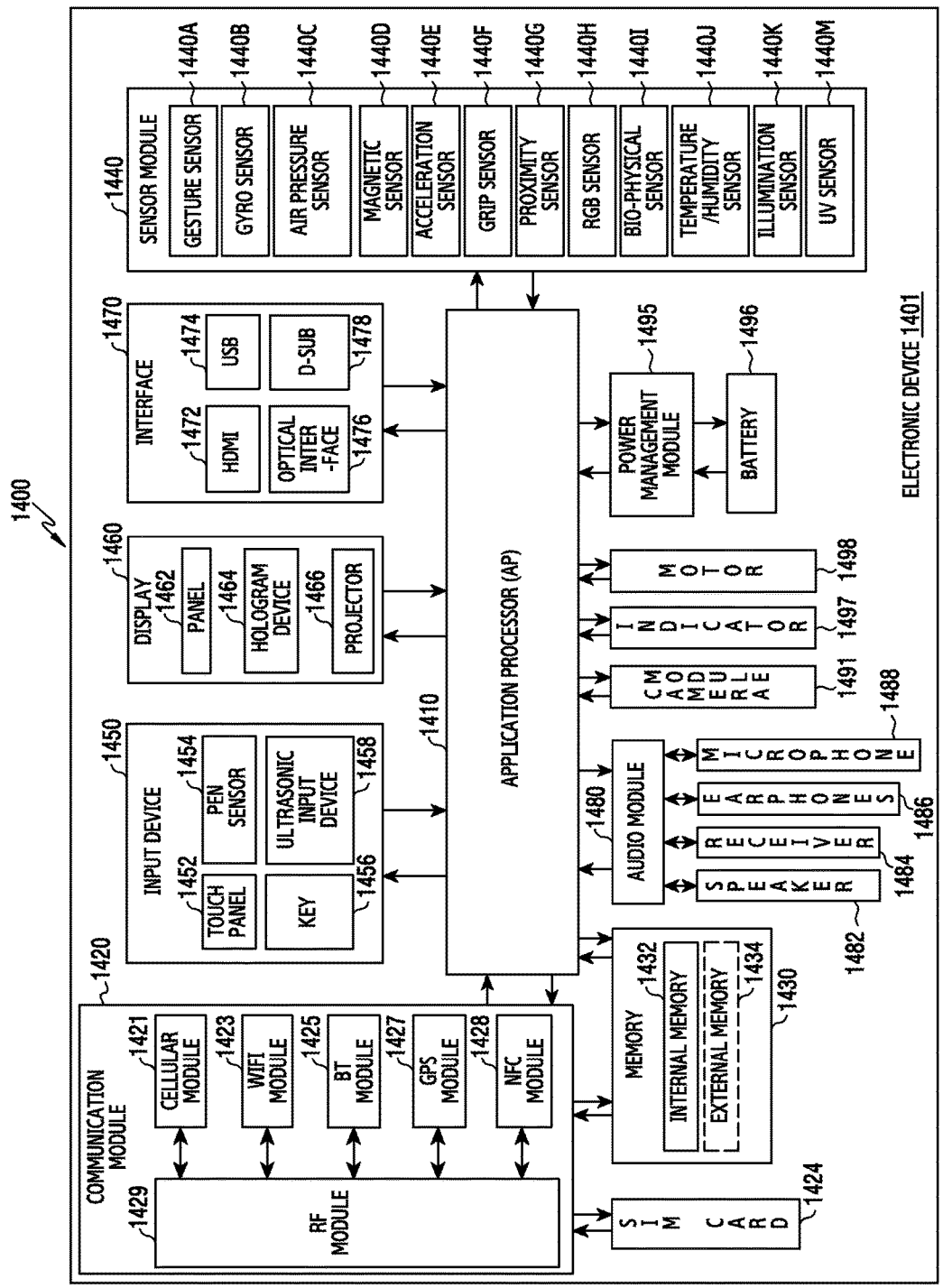
FIG. 14 is a block diagram illustrating a construction of an electronic device according to an embodiment of the present disclosure.

FIG. 14 is a block diagram illustrating a construction of an electronic device according to an embodiment of the present disclosure.

Referring to FIG. 14, a block diagram 1400 including an electronic device 1401 is illustrated, where the electronic device 1401 may, for example, construct the whole or part of the electronic device 101 illustrated in FIG. 1. As illustrated in FIG. 14, the electronic device 1401 may include one or more Application Processors (APs) 1410, a communication module 1420, a Subscriber Identification Module (SIM) card 1424, a memory 1430, a sensor module 1440, an input device 1450, a display 1460, an interface 1470, an audio module 1480, a camera module 1491, a power management module 1495, a battery 1496, an indicator 1497, and a motor 1498.

The AP 1410 can drive an operating system or application program and control a plurality of hardware or software constituent elements connected to the AP 1410. The AP 1410 can perform processing and operation of various data including multimedia data. The AP 1410 can be, for example, implemented as a System on Chip (SoC). According to an embodiment of the present disclosure, the AP 1410 can further include a Graphic Processing Unit (GPU) (not shown).

The communication module 1420 (e.g., the communication interface 160, as illustrated in FIG. 1) can perform data transmission/reception in communication between other electronic devices (e.g., the electronic device 104 or the server 106, as illustrated in FIG. 1) connected with the electronic device 1401 (e.g., the electronic device 101, as illustrated in FIG. 1) through a network. According to an embodiment of the present disclosure, the communication module 1420 can include a cellular module 1421, a Wi-Fi module 1423, a BT module 1425, a GPS module 1427, an NFC module 1428, and a Radio Frequency (RF) module 1429.

The cellular module 1421 can provide voice telephony, video telephony, a text service, an Internet service and the like through a communication network (e.g., LTE, LTE-A, CDMA, WCDMA, UMTS, WiBro, GSM or the like). Also, the cellular module 1421 can, for example, perform electronic device distinction and authorization within a communication network using a SIM (e.g., the SIM card 1424). According to an embodiment of the present disclosure, the cellular module 1421 can perform at least some functions among functions that the AP 1410 can provide. For example, the cellular module 1421 can perform at least a part of a multimedia control function.

According to an embodiment of the present disclosure, the cellular module 1421 can include a Communication Processor (CP). Also, the cellular module 1421 can be, for example, implemented as an SoC. Referring to FIG. 14, the constituent elements such as the cellular module 1421, the memory 1430, the power management module 1495 and the like are illustrated as constituent elements separate from the AP 1410. However, according to an embodiment of the present disclosure, the AP 1410 can be implemented to include at least some (e.g., the cellular module 1421) of the aforementioned constituent elements.

According to an embodiment of the present disclosure, the AP 1410 or the cellular module 1421 can load to a volatile memory an instruction or data received from a nonvolatile memory connected to each of the AP 1410 and the cellular module 1421 or at least one of other constituent elements, and process the loaded instruction or data. Also, the AP 1410 or the cellular module 1421 can store data received from at least one of other constituent elements or generated in at least one of the other constituent elements, in the nonvolatile memory.

The Wi-Fi module 1423, the BT module 1425, the GPS module 1427, and the NFC module 1428 can each include a processor for processing data transmitted/received through the corresponding module, for example. In FIG. 14, each of the cellular module 1421, the Wi-Fi module 1423, the BT module 1425, the GPS module 1427 and the NFC module 1428 is illustrated as a separate block. But, according to an embodiment of the present disclosure, at least some (e.g., two) of the cellular module 1421, the Wi-Fi module 1423, the BT module 1425, the GPS module 1427 and the NFC module 1428 can be included within one Integrated Circuit (IC) or IC package. For example, at least some processors corresponding to the cellular module 1421, the Wi-Fi module 1423, the BT module 1425, the GPS module 1427 and the NFC module 1428, for example, a communication processor corresponding to the cellular module 1421 and a Wi-Fi processor corresponding to the Wi-Fi module 1423 can be implemented as one SoC.

The RF module 1429 can perform data transmission/reception, for example, RF signal transmission/reception. The RF module 1429 can include, though not illustrated, a transceiver, a Power Amp Module (PAM), a frequency filter, a Low Noise Amplifier (LNA) or the like, for example. Also, the RF module 1429 can further include components, for example, a conductor, a conductive line and the like for transmitting/receiving an electromagnetic wave on a free space in wireless communication. Referring to FIG. 14, it is illustrated that the cellular module 1421, the Wi-Fi module 1423, the BT module 1425, the GPS module 1427, and the NFC module 1428 share one RF module 1429 with each other. But, according to an embodiment of the present disclosure, at least one of the cellular module 1421, the Wi-Fi module 1423, the BT module 1425, the GPS module 1427, and the NFC module 1428 can perform RF signal transmission/reception through a separate RF module.

The SIM card 1424 can be a card including a subscriber identification module, and can be inserted into a slot provided in a specific location of the electronic device 1401. The SIM card 1424 can include unique identification information (e.g., an Integrated Circuit Card ID (ICCID)) or subscriber information (e.g., an International Mobile Subscriber Identity (IMSI)).

The memory 1430 (e.g., the memory 130, as illustrated in FIG. 1) can include an internal memory 1432 and/or an external memory 1434. The internal memory 1432 can, for example, include at least one of a volatile memory (e.g., a Dynamic Random Access Memory (DRAM), a Static RAM (SRAM), a Synchronous DRAM (SDRAM) and the like) and a nonvolatile memory (e.g., a One-Time Programmable Read Only Memory (OTPROM), a PROM, an Erasable and Programmable ROM (EPROM), an Electrically Erasable and Programmable ROM (EEPROM), a mask ROM, a flash ROM, a Not AND (NAND) flash memory, a Not OR (NOR) flash memory and the like).

According to an embodiment of the present disclosure, the internal memory 1432 can be a Solid State Drive (SSD). The external memory 1434 can further include a flash drive, for example, Compact Flash (CF), Secure Digital (SD), micro-SD, Mini-SD, extreme Digital (xD), a memory stick or the like. The external memory 1434 can be functionally connected with the electronic device 1401 through various interfaces. According to an embodiment of the present disclosure, the electronic device 1401 can further include a storage device (or storage media) such as a hard drive.

The sensor module 1440 can measure a physical quantity or sense an activation state of the electronic device 1401, and convert measured or sensed information into an electrical signal. The sensor module 1440 can, for example, include at least one of a gesture sensor 1440A, a gyro sensor 1440B, an air pressure sensor 1440C, a magnetic sensor 1440D, an acceleration sensor 1440E, a grip sensor 1440F, a proximity sensor 1440G, a color sensor 1440H (e.g., a Red, Green, Blue (RGB) sensor), a bio-physical sensor 1440I, a temperature/humidity sensor 1440J, an illumination sensor 1440K, and a Ultraviolet (UV) sensor 1440M. Additionally or alternatively, the sensor module 1440 can, for example, include an E-nose sensor (not shown), an Electromyography (EMG) sensor (not shown), an Electroencephalogram (EEG) sensor (not shown), an Electrocardiogram (ECG) sensor (not shown), an Infrared (IR) sensor (not shown), an iris sensor (not shown), a fingerprint sensor (not shown) and the like. The sensor module 1440 can further include a control circuit for controlling at least one or more sensors belonging therein.

The input device 1450 can include a touch panel 1452, a (digital) pen sensor 1454, a key 1456, and an ultrasonic input device 1458. The touch panel 1452 can, for example, recognize a touch input in at least one method among a capacitive overlay method, a pressure sensitive method, an infrared beam method, and an acoustic wave method. Also, the touch panel 1452 can also further include a control circuit. In the capacitive overlay method, physical contact or proximity recognition is possible. The touch panel 1452 can also further include a tactile layer. In this case, the touch panel 1452 can provide a tactile response to a user.

The (digital) pen sensor 1454 can be, for example, implemented using the same or similar method to that of receiving a user's touch input or a separate sheet for recognition. The key 1456 can, for example, include a physical button, an optical key, a keypad, or a touch key. The ultrasonic input device 1458 is a device capable of confirming data by sensing a sound wave with a microphone 1488 of the electronic device 1401 through an input tool generating an ultrasonic signal. The ultrasonic input device 1458 is possible to perform wireless recognition. According to an embodiment of the present disclosure, by using the communication module 1420, the electronic device 1401 can also receive a user input from an exterior device (e.g., a computer or a server) connected to the communication module 1420.

The display 1460 (e.g., the display 150, as illustrated in FIG. 1) can include a panel 1462, a hologram device 1464, and a projector 1466. The panel 1462 can be, for example, a Liquid Crystal Display (LCD), an Active-Matrix Organic Light-Emitting Diode (AMOLED) or the like. The panel 1462 can be, for example, implemented to be flexible, transparent, or wearable. The panel 1462 can be also constructed together with the touch panel 1452 as one module. The hologram device 1464 can show a three-dimensional image in the air using interference of light. The projector 1466 can display a video by projecting light to a screen. The screen can be, for example, located inside or outside the electronic device 1401. According to an embodiment of the present disclosure, the display 1460 can further include a control circuit for controlling the panel 1462, the hologram device 1464, and the projector 1466.

The interface 1470 can, for example, include an HDMI 1472, a USB 1474, an optical interface 1476, or a D-sub-miniature (D-sub) 1478. The interface 1470 can be, for example, included in the communication interface 160 illustrated in FIG. 1. Additionally or alternatively, the interface 1470 can, for example, include a Mobile High-definition Link (MHL) interface, a Secure Digital/Multi Media Card (SD/MMC) interface, or an Infrared Data Association (IrDA) standard interface.

The audio module 1480 can convert sound and an electric signal interactively. At least some constituent elements of the audio module 1480 can be, for example, included in the input/output interface 140, as illustrated in FIG. 1. The audio module 1480 can process sound information inputted or outputted through a speaker 1482, a receiver 1484, earphones 1486, the microphone 1488, or the like, for example.

The camera module 1491 is a device capable of taking a still picture and a moving picture. According to an embodiment of the present disclosure, the camera module 1491 can include one or more image sensors (e.g., a front sensor or rear sensor), a lens (not shown), an Image Signal Processor (ISP) (not shown), or a flash (not shown) (e.g., an LED or a xenon lamp).

The power management module 1495 can manage power of the electronic device 1401. Though not illustrated, the power management module 1495 can include, for example, a Power Management IC (PMIC), a charger IC, and a battery or fuel gauge.

The PMIC can be, for example, mounted within an integrated circuit or a SoC semiconductor. A charging method can be divided into wired and wireless charging methods. The charger IC can charge a battery, and can prevent the introduction of overvoltage or overcurrent from an electric charger. According to an embodiment of the present disclosure, the charger IC can include a charger IC of at least one of the wired charging method and the wireless charging method. As the wireless charging method, there are, for example, a magnetic resonance method, a magnetic induction method, an electromagnetic wave method and the like. Supplementary circuits for wireless charging, for example, circuits such as a coil loop, a resonance circuit, a rectifier and the like can be added.

The battery gauge can, for example, measure a level of the battery 1496 and a voltage in charging, an electric current, and a temperature. The battery 1496 can store and generate electricity, and can supply a power source to the electronic device 1401 using the stored or generated electricity. The battery 1496 can, for example, include a rechargeable battery or a solar battery.

The indicator 1497 can display a specific state of the electronic device 1401 or part (e.g., the AP 1410) thereof, for example, a booting state, a message state, a charging state or the like. The motor 1498 can convert an electrical signal into a mechanical vibration. Though not illustrated, the electronic device 1401 can include a processing device (e.g., a GPU) for mobile TV support. The processing device for mobile TV support can process media data according to the standards of Digital Multimedia Broadcasting (DMB), Digital Video Broadcasting (DVB), a media flow or the like, for example.

The aforementioned constituent elements of an electronic device according to various embodiments of the present disclosure can be each comprised of one or more components, and a name of the corresponding constituent element can be different according to the kind of the electronic device. The electronic device according to the various embodiments of the present disclosure can include at least one of the aforementioned constituent elements, and can omit some constituent elements or further include additional other constituent elements. Also, some of the constituent elements of the electronic device according to various embodiments of the present disclosure are combined and constructed as one entity, thereby being able to identically perform the functions of the corresponding constituent elements before combination.

The term "module" used in various embodiments of the present disclosure can, for example, represent units including one or a combination of two or more of hardware, software, and firmware. The "module" can be used interchangeably with the terms "unit," "logic," "logical block," "component," "circuit" and the like, for example. The "module" can be the minimum unit of an integrally constructed component or part thereof. The "module" can be also the minimum unit performing one or more functions or part thereof. The "module" can be implemented mechanically or electronically. For example, the "module" according to various embodiments of the present disclosure can include at least one of an Application-Specific IC (ASIC) chip, Field-Programmable Gate Arrays (FPGAs) and a programmable logic device performing some operations known to the art or to be developed in the future.

According to various embodiments of the present disclosure, at least a part of an apparatus (e.g., modules or functions thereof) or method (e.g., operations) according to various embodiments of the present disclosure can be, for example, implemented by instructions stored in a computer-readable storage media in a form of a programming module. When the instruction is executed by one or more processors, the one or more processors can perform functions corresponding to the instructions. The computer-readable storage media can be the memory 1430, for instance. At least a part of the programming module can be, for example, implemented (e.g., executed) by the processor 1410. At least a part of the programming module can, for example, include a module, a program, a routine, a set of instructions, a process or the like for performing one or more functions.

The computer-readable recording media can include magnetic media such as a hard disk, a floppy disk, and a magnetic tape, optical media such as a Compact Disc-ROM (CD-ROM) and a DVD, a Magneto-Optical Media such as a floptical disk, and a hardware device specially configured to store and perform a program instruction (e.g., the programming module) such as a ROM, a RAM, a flash memory and the like. Also, the program instruction can include not only a mechanical code such as a code made by a compiler but also a high-level language code executable by a computer using an interpreter and the like. The aforementioned hardware device can be constructed to operate as one or more software modules so as to perform operations of various embodiments of the present disclosure, and vice versa.

A module or a programming module according to various embodiments of the present disclosure can include at least one or more of the aforementioned constituent elements, or omit some of the aforementioned constituent elements, or include additional other constituent elements. Operations carried out by the module, the programming module or the other constituent elements according to the various embodiments of the present disclosure can be executed in a sequential, parallel, repeated or heuristic method. Also, some operations can be executed in different order or can be omitted, or other operations can be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device for receiving another electronic device, the electronic device comprising:
   a mounting surface;
   a first support part positioned adjacent to the mounting surface;
   a second support part spaced apart from the first support part by a distance greater than at least a thickness of the other electronic device in a direction parallel to the mounting surface of the electronic device; and
   a holder recess provided in the mounting surface, the holder recess is for:
      connecting with the first support part and the second support part, and
      receiving the other electronic device,
   wherein, in a closed position, an end portion of the other electronic device is received in the holder recess adjacent to the second support part, and the end portion of the other electronic device is overlapped by the second support part, and
   wherein, in an open position, the other electronic device is rotated such that the end portion of the other electronic device is supported in the holder recess adjacent to the first support part, and the other electronic device is further supported by the second support part.

2. The electronic device of claim 1, wherein the holder recess is allows rotation of the other electronic device from the closed position to the open position.

3. The electronic device of claim 1, wherein the holder recess allows rotation of the other electronic device from the open position to the closed position.

4. The electronic device of claim 1, further comprising:
   guide ribs formed at ends of the holder recess,
   wherein the guide ribs are for:
      extending upward to at least an upper surface of the electronic device, and
      in the open position, preventing lateral movement of the other electronic device in the electronic device.

5. The electronic device of claim 2,
   wherein the second support part of the holder recess is for:
      in the open position, supporting a rear surface of the other electronic device, and
      in the closed position, accommodating the end of the other electronic device, and
   wherein, in the open position, the first support part supports a front surface of the other electronic device.

6. The electronic device of claim 1, further comprising:
   a sensor for sensing that the other electronic device is mounted onto the electronic device.

7. The electronic device of claim 6, wherein the sensor comprises a magnetic force sensor installed in the electronic device, and senses a magnetic force of a magnet installed in the other electronic device.

8. The electronic device of claim 6,
   wherein the sensor further comprises at least one of a physical switching device or a touch sensor arranged within the holder recess, and
   wherein the sensor senses that the other electronic device is mounted in one of the open position or the closed position.

9. The electronic device of claim 6, wherein, the electronic device and the other electronic device are configured to operatively interwork with each other according to at least one function if the sensor senses that the other electronic device is mounted onto the electronic device.

10. The electronic device of claim 9, wherein the at least one function comprises at least one of a power On/Off function of at least one of the electronic device and the other electronic device, a short-range wireless communication connection function between the electronic device and the other electronic device, a power saving function, or a mode change function.

11. The electronic device of claim 1, wherein the electronic device and the other electronic device are configured to:
   be individually operated, or
   interwork with each other.

12. The electronic device of claim 1, further comprising:
   at least one key button installed as a data input device on the mounting surface.

13. The electronic device of claim 1, wherein the other electronic device comprises a display for accepting and outputting a key button input of the electronic device if the other electronic device operatively interworks with the electronic device.

14. The electronic device of claim 1, further comprising:
   a sensor for sensing opening or closing of the other electronic device with respect to the electronic device.

15. The electronic device of claim 1, wherein the other electronic device is rotatable at one end thereof along the holder recess serving as a pivot shaft.

16. The electronic device of claim 1, further comprising:
   a rotatable clip installed in the mounting surface,
   wherein the rotatable clip is for accommodating another end portion of the other electronic device to secure the other electronic device to the electronic device in the closed position.

17. An electronic device comprising:
   a mounting surface configured to receive another electronic device; and
   a holder recess provided in the mounting surface;
   wherein, in a first configuration, when the other electronic device is held in the holder recess at a certain holding angle, the holder recess supports the other electronic device at the certain holding angle,
   wherein, in a second configuration, when the other electronic device is overlapped to the electronic device, the holder recess accommodates one end of the other electronic device, and
   wherein a distance between opposite ends of the holder recess in a direction parallel to the mounting surface is greater than at least a thickness of the other electronic device.

18. The electronic device of claim 17, further comprising:
   a rotatable clip installed in the mounting surface,
   wherein the rotatable clip is for accommodating a portion of the other electronic device to secure the other electronic device to the electronic device in the second configuration.

19. An electronic device comprising:
   a mounting surface; and
   a holder recess provided in the mounting surface, the holder recess comprising:

a step part formed between the mounting surface and a bottom of the holder recess, and a support part for extending above the mounting surface from an opposite side of the step part, and overlapping at least part of the bottom of the holder recess, wherein, at an open position, the holder recess receives another electronic device, and allows rotation of the other electronic device to a closed position in which the other electronic device is accommodated at one end by the holder recess, with the support part overlapping a part of the other electronic device, such that the other electronic device is combined with the electronic device, and wherein the step part and the support part are spaced at least a distance greater than a thickness of the other electronic device in a direction parallel to the mounting surface.

20. The electronic device of claim 1, further comprising:

a rotatable clip installed in the mounting surface, wherein the rotatable clip is for accommodating a portion of the other electronic device to secure the other electronic device to the electronic device in the closed position.

* * * * *